United States Patent
Choi et al.

(10) Patent No.: US 11,647,553 B2
(45) Date of Patent: May 9, 2023

(54) METHOD AND APPARATUS FOR PERFORMING DUAL CONNECTIVITY FOR UES IN WIRELESS COMMUNICATION SYSTEM

(71) Applicant: Samsung Electronics Co., Ltd., Suwon-si (KR)

(72) Inventors: Seunghoon Choi, Suwon-si (KR); Jinkyu Kang, Suwon-si (KR); Youngbum Kim, Suwon-si (KR); Taehyoung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/989,115

(22) Filed: Aug. 10, 2020

(65) Prior Publication Data
US 2021/0045174 A1 Feb. 11, 2021

(30) Foreign Application Priority Data

Aug. 8, 2019 (KR) .................. 10-2019-0096888
Oct. 10, 2019 (KR) .................. 10-2019-0125608

(51) Int. Cl.
*H04W 76/15* (2018.01)
*H04W 8/24* (2009.01)
(Continued)

(52) U.S. Cl.
CPC ............. *H04W 76/15* (2018.02); *H04L 5/14* (2013.01); *H04W 8/24* (2013.01); *H04W 72/1263* (2013.01); *H04W 84/18* (2013.01)

(58) Field of Classification Search
CPC ... H04W 8/24; H04W 72/1263; H04W 76/15; H04W 84/18; H04L 5/14
(Continued)

(56) References Cited

U.S. PATENT DOCUMENTS

2016/0128989 A1  5/2016  Alcouffe
2017/0013565 A1* 1/2017  Pelletier .............. H04W 52/365
(Continued)

FOREIGN PATENT DOCUMENTS

WO    2015/188886 A1    12/2015
WO    2020/051286 A1    3/2020
(Continued)

OTHER PUBLICATIONS

Qualcomm Incorporated, 'Enhancements for EN-DC Single-Tx TDM Operation', R1-1907305, 3GPP TSG RAN WG1 Meeting #97, Reno, USA, sections 1-3, May 13-17, 2019.
(Continued)

*Primary Examiner* — Congvan Tran
(74) *Attorney, Agent, or Firm* — Jefferson IP Law, LLP

(57) ABSTRACT

A communication method and system for converging a $5^{th}$ generation (5G) communication system for supporting higher data rates beyond a $4^{th}$ generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. The disclosure relates to a method and apparatus for performing, by a user equipment, dual connectivity in a wireless communication system. The method includes receiving, from a base station, a configuration information associated with a dual uplink transmission, the configuration information being associated with an uplink transmission timing for a master cell group (MCG), identifying that capability information transmitted to the base station does not indicate capability for the configuration information for dual uplink transmission, dropping an uplink transmission for a secondary cell group (SCG), in case the
(Continued)

uplink transmission for the SCG overlaps with an uplink transmission for the MCG, and transmitting, to the base station, the uplink transmission for the MCG based on the configuration information.

8 Claims, 17 Drawing Sheets

(51) Int. Cl.
    *H04W 72/1263*    (2023.01)
    *H04L 5/14*    (2006.01)
    *H04W 84/18*    (2009.01)

(58) Field of Classification Search
    USPC .......................................................... 320/329
    See application file for complete search history.

(56) References Cited

U.S. PATENT DOCUMENTS

| | | | |
|---|---|---|---|
| 2019/0075524 A1* | 3/2019 | Zhou | H04W 16/32 |
| 2019/0320396 A1* | 10/2019 | Bagheri | H04W 52/146 |
| 2019/0364517 A1* | 11/2019 | Gaal | H04W 48/18 |
| 2020/0022097 A1* | 1/2020 | Wang | H04W 52/146 |
| 2020/0092210 A1* | 3/2020 | Thanneeru | H04W 28/0247 |
| 2020/0314771 A1 | 10/2020 | Frank | |
| 2020/0337101 A1* | 10/2020 | Brooks | H04L 41/16 |
| 2022/0104149 A1* | 3/2022 | Takeda | H04W 52/146 |

FOREIGN PATENT DOCUMENTS

| | | |
|---|---|---|
| WO | 2020/222562 A1 | 11/2020 |
| WO | 2021/227044 A1 | 11/2021 |

OTHER PUBLICATIONS

Ericsson, 'Power Control for NR-NR DC', R1-1907330, 3GPP TSG RAN WG1 Meeting #97, Reno, USA, section 2; and figure 1, May 13-17, 2019.

ZTE Corporation, 'Discussion on single Tx switched uplink solution for EN-DC', R1-1906421, 3GPP TSG RAN WG1 Meeting #97, Reno, USA, section 2.4; and figures 2, 4, May 13-17, 2019.

Intel Corporation, 'Further discussions on single UL operation enhancement for EN-DC', R1-1906828, 3GPP TSG RAN WG1 Meeting #97, Reno, USA, sections 1-2.2; and figure 1, May 13-17, 2019.

International Search Report dated Nov. 6, 2020, issued in International Application No. PCT/KR2020/010553.

Extended European Search Report dated Jul. 28, 2022, issued in a counterpart European Application No. 20850034.8.

Motorola Mobility: "Further Discussion of SCG MPR/A-MPR and PCMAX for EN-DC with Dynamic Power Sharing", 3GPP Draft; R4-1906957, 3rd Generation Partnership Project (3GPP), Mobile Competence Centre ; 650, Route Des Lucioles ; F-06921 Sophia-Antipolis Cedex ; FRANCE, vol. RAN WG4, No. XP051733811; May 13, 2019, Reno, U.S.A.

Motorola Mobility: "On the SCG MPR/A-MPR and Pcmax for EN-DC with Dynamic Power Sharing", 3GPP Draft; R4-1904676, 3rd Generation Partnership Project (3GPP), Mobile Competence Centre ; 650, Route Des Lucioles ; F-06921 Sophia-Antipolis Cedex ; France, vol. RAN WG4, No. XP051715003; Apr. 1, 2019, Xi'an, China.

Nokia et al: "Discussion on single uplink operation enhancement for EN-DC", 3GPP Draft; R1-1904721 EN-DC Single Uplink Operation Enhancements, 3rd Generation Partnership Project (3GPP), Mobile Competence Centre ; 650, Route Des Lucioles ; F-06921 Sophia-Antipolis Cedex ; France, vol. RAN WG1, No. XP051699905; Apr. 7, 2019, Xi'an, China.

Apple Inc: "Feature lead summary of remaining issues on potential enhancements to single Tx switched uplink for EN-DC", 3GPP Draft; R1-1905781 Summary of Remaining Issues on Potential Enhancements to Single Tx Switched Uplink for EN-DC, 3rd Generation Partnership Project (3GPP), Mobile Competence Centre ; 650, Route DE, vol. RAN WG1, No. XP051704915; Apr. 15, 2019, Xi'an, China.

LG Electronics: "Discussion on further details on dynamic power sharing for LTE-NR DC", 3GPP Draft; R1-1717984 UL PC for DC, 3rd Generation Partnership Project (3GPP), Mobile Competence Centre ; 650, Route Des Lucioles ; F-06921 SophiaAntipolis Cedex ; France, vol. RAN WG1, No. XP051341168; Oct. 8, 2017, Prague, CZ.

Huawei et al: "UL power control for NR-NR dual connectivity", 3GPP Draft; R1-1901551,3rd Generation Partnership Project (3GPP), Mobile Competence Centre ; 650, Route Des Lucioles ; F-06921 Sophia-Antipolis Cedex ; France, vol. RAN WG1, No. XP051599248; Feb. 16, 2019, Athens, Greece.

\* cited by examiner

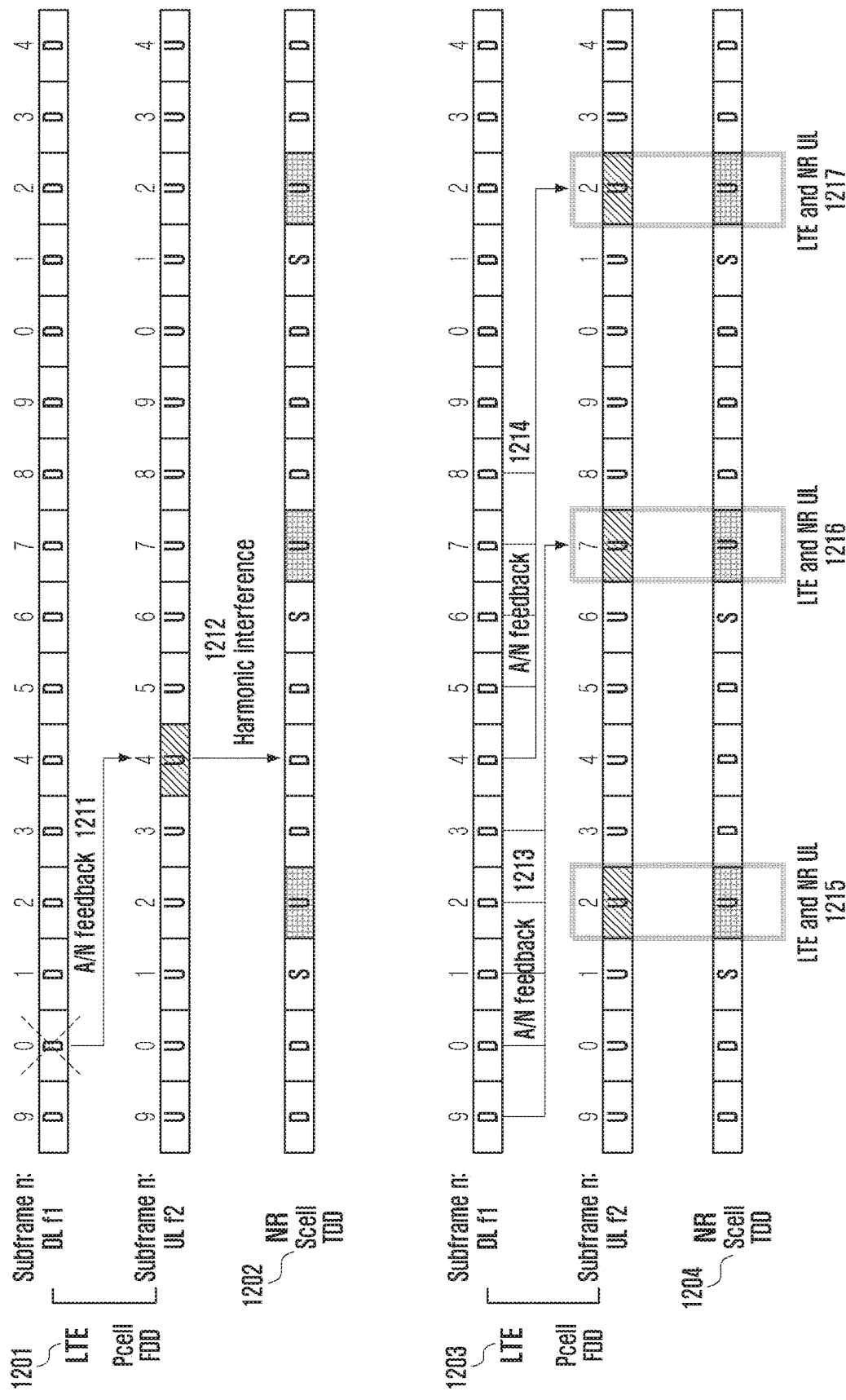

METHOD AND APPARATUS FOR PERFORMING DUAL CONNECTIVITY FOR UES IN WIRELESS COMMUNICATION SYSTEM

CROSS-REFERENCE TO RELATED APPLICATION(S)

This application is based on and claims priority under 35 U.S.C. § 119 of a Korean patent application number 10-2019-0096888, filed on Aug. 8, 2019, and of a Korean patent application number 10-2019-0125608, filed on Oct. 10, 2019, in the Korean Intellectual Property Office, the disclosure of each of which is incorporated by reference herein in its entirety.

BACKGROUND

1. Field

The disclosure relates to a method and apparatus for performing, a user equipment, dual connectivity in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long-term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid frequency shift keying (FSK) and quadrature amplitude modulation (QAM) (MANI) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, in a communication system, various types of research are carried out on a scheme for transmitting an uplink control channel. In particular, schemes for transmitting a physical uplink control channel (PUCCH), a physical uplink shared channel (PUSCH), etc. are discussed in many different ways.

The above information is presented as background information only to assist with an understanding of the disclosure. No determination has been made, and no assertion is made, as to whether any of the above might be applicable as prior art with regard to the disclosure.

SUMMARY

A user equipment (UE) capable of dual connectivity with LTE and a new radio (NR) may transmit and receive data with respect to LTE and NR cells, respectively. The UE may be configured to support only one uplink (UL) transmission based on the capability of the UE and permission in a specific band combination upon dual connectivity.

Aspects of the disclosure are to address at least the above-mentioned problems and/or disadvantages and to provide at least the advantages described below. Accordingly, an aspect of the disclosure is to provide a method and apparatus for performing, by a UE, uplink transmission depending on whether the UE has a dynamic power sharing capability in a situation in which long-term evolution time division duplex (LTE TDD) is a primary cell and an NR is a secondary cell.

LTE downlink reception or NR downlink reception of a UE may be subjected to an interference influence and downlink reception performance may be degraded due to interference attributable to inter-modulation (IM) or harmonics, which occur due to LTE uplink transmission or NR uplink transmission performed by the UE based on a specific band combination of a frequency for LTE and NR transmission and reception.

Another aspect of the disclosure is to provide a method and apparatus for avoiding an interference influence with LTE downlink reception or NR downlink reception occurring due to LTE uplink or NR uplink transmission in a situation in which LTE frequency division duplex (FDD) is a primary cell and an NR is a secondary cell.

Additional aspects will be set forth in part in the description which follows and, in part, will be apparent from the description, or may be learned by practice of the presented embodiments.

In accordance with an aspect of the disclosure, a method performed by a terminal is provided. The method includes receiving, from a base station, a configuration information associated with a dual uplink transmission, the configuration information being associated with an uplink transmission timing for a master cell group (MCG), identifying that capability information transmitted to the base station does not indicate capability for the configuration information for dual uplink transmission, dropping an uplink transmission for a secondary cell group (SCG), in case that the uplink transmission for the SCG overlaps with an uplink transmission for the MCG, and transmitting, to the base station, the uplink transmission for the MCG based on the configuration information.

In accordance with another aspect of the disclosure, a terminal is provided. The terminal includes a transceiver, and at least one processor configured to control the transceiver to receive, from a base station, a configuration information associated with a dual uplink transmission, the configuration information being associated with an uplink transmission timing for a master cell group (MCG), identify that capability information transmitted to the base station does not indicate capability for the configuration information for dual uplink transmission, control the transceiver to drop an uplink transmission for a secondary cell group (SCG), in case that the uplink transmission for the SCG overlaps with an uplink transmission for the MCG, and control the transceiver to transmit, to the base station, the uplink transmission for the MCG based on the configuration information.

In accordance with another aspect of the disclosure, a method performed by a base station is provided. The method includes transmitting, to a terminal, and receiving, from a base station, a configuration information associated with a dual uplink transmission, the configuration information being associated with an uplink transmission timing for a master cell group (MCG), identifying that capability information received from the terminal does not indicate capability for the configuration information for dual uplink transmission, and receiving, from the terminal, an uplink transmission for the MCG based on the configuration information, wherein an uplink transmission for a secondary cell group (SCG) is dropped by the terminal, in case the uplink transmission for the SCG overlaps with the uplink transmission for the MCG.

In accordance with another aspect of the disclosure, a base station is provided. The base station includes a transceiver, and at least one processor configured to control the transceiver to transmit, to a terminal, and receive, from a base station, a configuration information associated with a dual uplink transmission, the configuration information being associated with an uplink transmission timing for a master cell group (MCG), identify that capability information received from the terminal does not indicate capability for the configuration information for dual uplink transmission, and control the transceiver to receive, from the terminal, an uplink transmission for the MCG based on the configuration information, wherein an uplink transmission for a secondary cell group (SCG) is dropped by the terminal, in case the uplink transmission for the SCG overlaps with the uplink transmission for the MCG.

According to an embodiment of the disclosure, a method and apparatus for solving, by a UE having dual connectivity, an interference problem in a wireless communication system can be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 12 is a diagram illustrating the second interference situation to be solved according to an embodiment of the disclosure;

Throughout the drawings, like reference numerals will be understood to refer to like parts, components, and structures.

DETAILED DESCRIPTION

Figure 1:
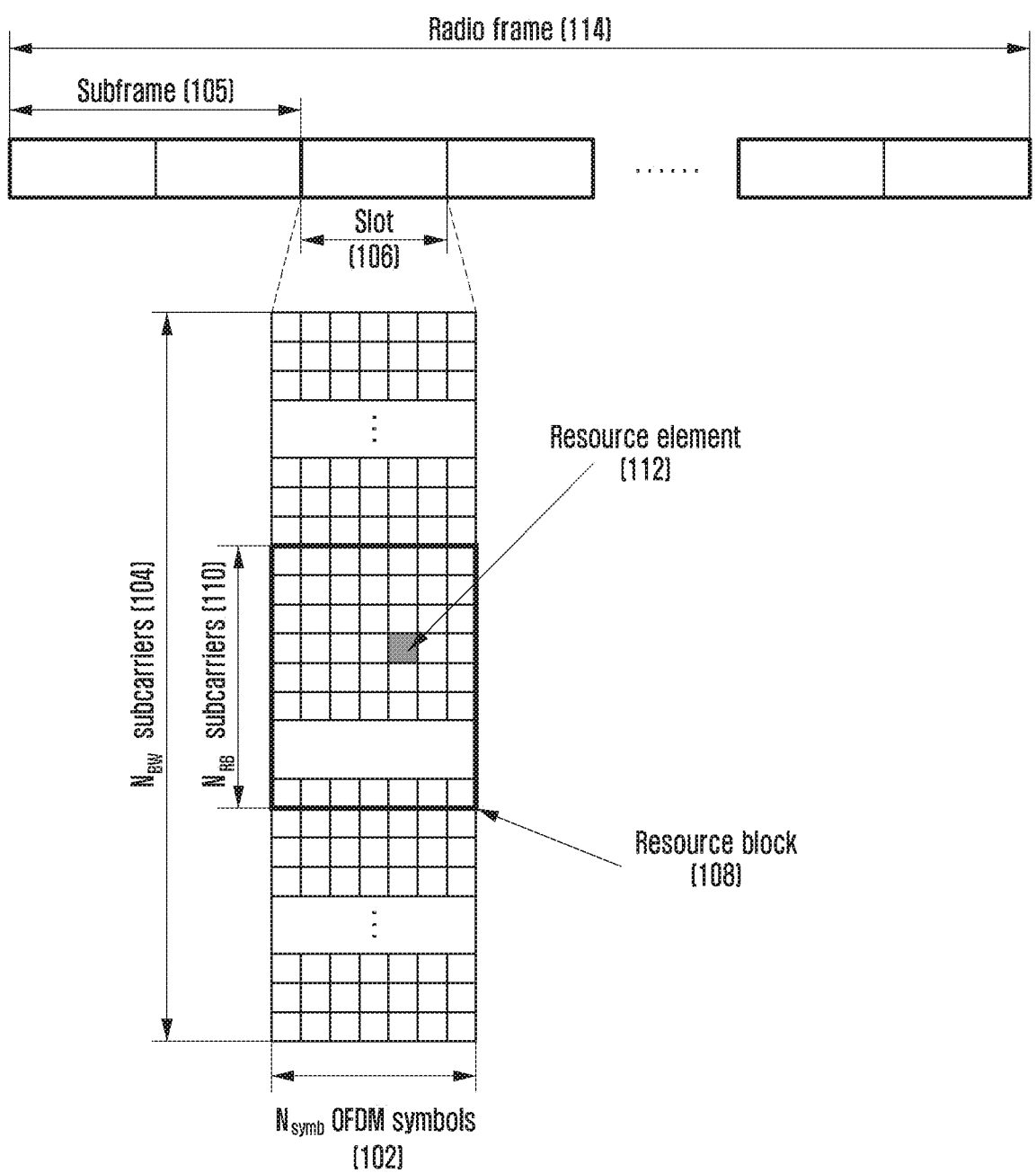
FIG. 1 is a diagram illustrating a basic structure of a time-frequency domain in an LTE system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing apparatus, so that the instructions executed by the processor of the computer or other programmable data processing apparatus create means for executing the functions specified in the flowchart block(s). These computer program instructions may also be stored in computer-usable or computer-readable memory that can direct a computer or other programmable data processing equipment to implement a function in a particular manner, such that the instructions stored in the computer-usable or computer-readable memory produce an article of manufacture including instruction means that implement the function specified in the flowchart block(s). The computer program instructions may also be loaded on a computer or other programmable data processing apparatus to cause a series of operational steps to be performed on the computer or programmable data processing equipment to produce a computer-executed process, so that the instructions performing the computer or programmable data processing equipment provide steps for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

The term "unit", as used in the embodiment means software or a hardware component, such as a field programmable gate array (FPGA) or an application specific integrated circuit (ASIC), and the "unit" performs specific tasks. However, the term "~unit" does not mean that it is limited to software or hardware. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables." The functionalities provided in the components and "units" may be combined into fewer components and "units" or may be further separated into additional components and "units." Furthermore, the components and "units" may be implemented to operate on one or more CPUs within a device or a security multimedia card.

In describing the disclosure, a detailed description of a related known function or configuration will be omitted if it is deemed to make the gist of the disclosure unnecessarily vague. Furthermore, terms to be described hereinafter have been defined by taking into consideration functions in the disclosure, and may be different depending on a user, an operator's intention or practice. Accordingly, each term should be defined based on contents over the entire specification.

Furthermore, in specifically describing embodiments of the disclosure, a major target is a wireless communication system based on orthogonal frequency division multiplexing (OFDM), in particular, the 3rd generation partnership project (3GPP) evolved universal terrestrial radio access (EU-TRA) standard, but a major gist of the disclosure may be slightly changed without greatly departing from the scope of the disclosure, and may be applied to other communication systems having a similar technical background and channel form. This may be determined by a person having skilled knowledge in the art to which the disclosure pertains.

Meanwhile, research in which new 5G communication (or called NR communication in the disclosure) and the existing LTE communication are made to coexist in the same spectrum in a mobile communication system is carried out.

The disclosure relates to a wireless communication system, and more particularly, to a method and apparatus for transmitting and receiving, by a user equipment (UE) capable of transmitting and receiving data, data to and from each of different wireless communication systems in at least one of the different wireless communication systems which coexist in one carrier frequency or multiple carrier frequencies.

In general, a mobile communication system was developed to provide voice services while guaranteeing the activity of a user. However, the mobile communication system has its area gradually extended to data services in addition to voice, and has recently been developed to provide high-speed data services. However, a more advanced mobile communication system is required because resources are insufficient and users require higher speed services in a current mobile communication system that provides services.

In line with these demands, a standard task for long-term evolution (LTE) in the $3^{rd}$ generation partnership project (3GPP) is in progress as one system being developed as a next-generation mobile communication system. LTE is a technology for implementing high-speed packet-based communication having a maximum transfer rate of about 100 Mbps. To this end, several schemes are discussed. For example, a scheme for reducing the number of nodes on a communication path by simplifying the structure of a network, a scheme for making radio protocols approach a radio channel as much as possible, etc. are discussed.

An LTE system adopts a hybrid automatic repeat request (HARQ) method of retransmitting corresponding data in a physical layer when a decoding failure occurs in initial transmission. According to the HARQ method, if a receiver has not accurately decoded data, the receiver transmits, to a transmitter, information (negative acknowledgement (HACK)) that notifies a decoding failure so that the transmitter can retransmit the corresponding data in the physical layer. The receiver combines the data, retransmitted by the transmitter, with the existing data for which decoding has failed, thereby improving data reception performance. Furthermore, according to the HARQ method, if a receiver has accurately decoded data, the receiver transmits, to a transmitter, information (acknowledgement (ACK)) that notifies a decoding success so that the transmitter can transmit new data.

FIG. 1 is a diagram illustrating a basic structure of a time-frequency domain, which is a radio resource region in which downlink (DL) data or a control channel of an LTE system is transmitted according to an embodiment of the disclosure.

Referring to FIG. 1, a transverse axis indicates a time domain, and a longitudinal axis indicates a frequency domain. A minimum transmission unit in the time domain is an OFDM symbol. $N_{symb}$ (102) OFDM symbols gather to configure one slot 106. 2 slots gather to configure one subframe 105. The length of the slot is 0.5 ms, and the length of the subframe is 1.0 ms. Furthermore, a radio frame 114 is a time domain unit configured with 10 subframes. A minimum transmission unit in the frequency domain is a subcarrier. The bandwidth of the entire system transmission band is configured with a total of $N_{BW}$ subcarriers 104.

In the time-frequency domain, a basic unit of a resource is a resource element (RE) 112 and may be indicated as an OFDM symbol index and a subcarrier index. A resource block (RB) (or physical resource block (PRB)) 108 is defined by $N_{symb}$ contiguous OFDM symbols 102 in the time domain and as $N_{RB}$ contiguous subcarriers 110 in the frequency domain. Accordingly, one RB 108 is configured with $N_{symb} \times N_{RB}$ REs 112. In general, a minimum transmission unit of data is an RB unit. In an LTE system, in general, the $N_{symb}=7$, $N_{RB}=12$, and $N_{BW}$ and $N_{RB}$ are proportional to the bandwidth of a system transmission bandwidth. A data rate increases in proportion to the number of RBs scheduled in a user equipment (UE). An LTE system defines and operates 6 transmission bandwidths. In the case of an FDD system in which the downlink (DL) and the uplink (UL) are divided into frequencies and operated, a DL transmission bandwidth and an UL transmission bandwidth may be different. A channel bandwidth indicates a radio frequency (RE) bandwidth corresponding to a system transmission bandwidth. Table 1 illustrates a correspondence relation between system transmission bandwidths and channel bandwidths defined in the LTE system. For example, in an LTE system having a 10 MHz channel bandwidth, a transmission bandwidth is configured with 50 RBs.

TABLE 1

| | Channel bandwidth $BW_{channel}$ [MHz] | | | | |
|---|---|---|---|---|---|
| | 1.4 | 3 | 5 | 10 | 15 | 20 |
| Transmission bandwidth configuration | 6 | 15 | 25 | 50 | 75 | 100 |

DL control information is transmitted within the first N OFDM symbols within the subframe. In general, N={1, 2, 3}. Accordingly, the N value varies every subframe depending on the amount of control information that needs to be transmitted in a current subframe. The control information includes a control channel transmission interval indicator indicating over how many OFDM symbols control information may be transmitted, scheduling information for DL data or UL data, an HARQ ACK/NACK signal, etc.

In the LTE system, scheduling information for DL data or UL data is transmitted from a base station (BS) to a UE through DL control information (DCI). The uplink (UL) refers to a radio link through which a. UE transmits data or a control signal to a BS. The downlink (DL) refers to a radio link through which a BS transmits data or a control signal to a UE. Several formats are defined for the DCI. A predetermined DCI format is applied and operated depending on whether DCI is scheduling information for UL data (UL grant) or scheduling information for DL data (DL grant), whether DCI is compact DCI having a small size of control information, whether DCI applies spatial multiplexing using multiple antennas, or whether DCI is DCI for power control. For example, a DCI format 1, that is, scheduling control information for DL data (DL grant), is configured to include at least the following control information.

Resource allocation type 0/1 flag: this notifies whether a resource allocation method is a type 0 or a type 1. In the type 0, a resource is allocated in a resource block group (RBG) unit by applying a bitmap method. In an LTE system, a basic unit for scheduling is a resource block (RB) represented as time and frequency domain resources. An RBG is configured with a plurality of RBs, and is a basic unit for scheduling in the type 0 method. In the type 1, a specific RB is allocated within the RBG.

Resource block assignment: this notifies an RB assigned to data transmission. A represented resource is determined depending on a system bandwidth and a resource allocation method.

Modulation and coding scheme (MCS): this notifies a modulation scheme used for data transmission and the size of a transport block, that is, data to be transmitted.

HARQ process number: this notifies a process number of an HARQ.

New data indicator: this notifies whether transmission is HARQ initial transmission or retransmission.

Redundancy version: this notifies a redundancy version of an HARQ.

Transmit power control (TPC) command for a physical uplink control channel (PUCCH): this notifies TPC for a PUCCH, that is, an UL control channel.

The DCI is transmitted through a physical downlink control channel (PDCCH) or an enhanced PDCCH (EPDCCH), that is, a DL physical control channel, through a channel coding and modulation process.

In general, the DCI is independently channel-coded with respect to each UE, configured as an independent PDCCH, and transmitted. In the time domain, a PDCCH is mapped and transmitted during the control channel transmission interval. The frequency domain mapping location of the PDCCH is determined by the identifier (ID) of a UE, and is spread into the entire system transmission bandwidth.

DL data is transmitted through a physical downlink shared channel (PDSCH), that is, a physical channel for DL data transmission. The PDSCH is transmitted after the control channel transmission interval. Scheduling information, such as detailed mapping location and a modulation scheme in the frequency domain, is notified by DCI transmitted through a PDCCH.

A BS notifies a UE of a modulation scheme applied to a PDSCH to be transmitted and the size of data to be transmitted (transport block size (TBS)) through an MCS configured with 5 bits among pieces of control information configuring the DCI. The TBS corresponds to a size before channel coding for error correction is applied to a data (transport block (TB)) to be transmitted by the BS.

Modulation schemes supported in the LTE system include quadrature phase shift keying (QPSK), 16 quadrature amplitude modulation (QAM), and 64 QAM, which have modulation orders ($Q_m$) of 2, 4, and 6, respectively. That is, 2 bits per symbol may be transmitted in the case of the QPSK modulation, 4 bits per symbol may be transmitted in the case of the 16 QAM modulation, and 6 bits per symbol may be transmitted in the case of the 61 QAM modulation.

In 3GPP LTE Rel-10, a bandwidth extension technology was adopted in order to support a higher data transfer rate compared to LTE Rel-8. The technology called a bandwidth extension or carrier aggregation (CA) can increase the data transfer rate as much as an extended band, compared to an LTE Rel-8 UE that transmits data in one band by extending the band. Each of the bands is called a component carrier (CC). An LTE Rel-8 UE is defined to have one CC for each of DL and UL. Furthermore, a DL CC and an UL CC subjected to an SIB-2 connection therewith are collectively called a cell. The SIB-2 connection relation between the DL CC and the UL CC is transmitted through a system signal or a higher signal. A UE that supports a CA may receive DL data and transmit UL data through multiple serving cells.

In Rel-10, if a BS is in a situation in which it is difficult for the BS to transmit a physical downlink control channel (PDCCH) to a specific UE in a specific serving cell, the BS may transmit the PDCCH in another serving cell, and may configure, in the UE, a carrier indicator field (CIF) as a field that notifies the UE that the corresponding PDCCH indicates a physical downlink shared channel (PDSCH) or physical uplink shared channel (PUSCH) of the another serving cell. The CIF may be configured in a UE supporting a CA. The CIF has been determined to indicate another serving cell by adding 3 bits to PDCCH information in a specific serving cell. The CIF is included only when it is configured through a higher signal so that cross-carrier scheduling is performed. If the CIF is not configured through a higher signal so that cross-carrier scheduling is performed or the CIF is configured through a higher signal so that self-scheduling is performed, the CIF is not included. In this case, the cross-carrier scheduling is not performed. When the CIF is included in DL assignment information, the CIF is defined to indicate a serving cell to which a PDSCH scheduled by DL assignment will be transmitted. When the CIF is included in UL resource assignment information (UL grant), the CIF is defined to indicate a serving cell to which a PUSCH scheduled by an UL grant will be transmitted.

As described above, in LTE Rel-10, a carrier aggregation (CA), that is, a bandwidth extension technology, is defined, and thus multiple serving cells may be configured in a UE. Furthermore, the UE transmits channel information for the multiple serving cells to a BS periodically or aperiodically for the data scheduling of the BS. The BS schedules data for each carrier and transmits the data. The UE transmits A/N feedback for the data transmitted for each carrier. LTE Rel-10 has been designed to transmit A/N feedback having a maximum of 21 bits. If the transmission of the A/N feedback and the transmission of channel information overlap in one subframe, LTE Rel-10 has been designed to transmit the A/N feedback and to discard channel information, LTE Rel-11 has been designed to multiplex channel information of one cell along with A/N feedback so that A/N feedback having a maximum of 22 bits and channel information of one cell are transmitted based on a PUCCH format 3 in the transmission resource of a PUCCH format 3.

In LTE Rel-13, a maximum of 32 serving cell configuration scenarios are assumed. A concept for extending the number of serving cells up to a maximum of 32 serving cells using a band in an unlicensed band in addition to a licensed band has been completed. Furthermore, by taking into consideration that the number of licensed bands, such as an LTE frequency, is limited, to provide LTE services in an unlicensed band, such as a 5 GHz band, has been completed. This is called licensed assisted access (LAA). The LAA supports that an LTE cell, that is, a licensed band, operates as a P cell and an LAA cell, that is, an unlicensed band, operates as an S cell by applying the CA technology in LTE, Accordingly, as in feedback occurring in an LAA cell, that is, an S cell, as in LTE needs to be transmitted only in a P cell. The LAA cell may be freely applied by a DL subframe and an UL subframe. Unless described otherwise in this specification, LTE is described as including all advanced technologies of LTE, such as LTE-A and LAA.

In general, a TDD communication system uses a common frequency in the DL and UL, but differently operates the transmission and reception of an UL signal and a DL signal in the time domain. In LTE TDD, an UL signal and a DL signal are divided and transmitted for each subframe, Subframes for UL/DL may be equally divided and operated in the time domain, more subframes may be assigned to the DL and operated, or more subframes may be assigned to the UL and operated depending on traffic loads of the UL and the DL. In LTE, the length of a subframe is 1 ms, and 10 subframes gather to configure one radio frame.

TABLE 2

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Table 2 illustrates TDD UL-DL configurations (or may also be called TDD UL-DL configurations) defined in LTE. In Table 2, "D" indicates a subframe configured for DL transmission. "U" indicates a subframe configured for UL transmission. "S" indicates a special subframe configured as a downlink pilot time slot (DwPTS), a guard period (GP), or an uplink pilot time slot (UpPTS). As in a common subframe, control information may be transmitted in the DwPTS in the DL. If the length of the DwPTS is sufficiently long, DL data may also be transmitted depending on a configuration state of a special subframe. The GP is an interval in which the transition of a transmission state from the DL to the UL is accommodated, and the length of the GP is determined based on a network configuration, etc. The UpPTS is used for a UE to transmit a sounding reference signal (SRS) necessary to estimate an UL channel state and for a UE to transmit a random access channel (RACH) for random access.

For example, in the case of the TDD UL-DL configuration #6, DL data and DL control information may be transmitted in the subframes #0, #5, and #9, and UL data and UL control information may be transmitted in the subframes #2, #3, #4, #7, and #8. Furthermore, DL control information and in some cases, DL data may be transmitted in the subframes #1 and #6 corresponding to special subframes, and an SRS or RACH may be transmitted in the UL.

In a TDD system, since DL or UL signal transmission is permitted during a specific time interval only, detailed timing relations between UL/DL physical channels having mutual relations, such as a control channel for data scheduling, a scheduled data channel, and an HARQ ACK/NACK (or HARQ-ACK) channel corresponding to a data channel, need to be defined.

First, in an LTE TDD system, an UL/DL timing relation between a physical downlink shared channel (PDSCH), that is, a physical channel for DL data transmission, and a physical uplink control channel (PUCCH) or a physical uplink shared channel (PDSCH), that is, a physical channel in which UL HARQ ACK/NACK corresponding to the PDSCH is transmitted, is as follows.

When receiving a PDSCH transmitted in a subframe n-k from a BS, a UE transmits UL HARQ ACK/NACK for the PDSCH in an UL subframe n. In this case, the k is a constituent element of a set K, and K is defined in Table 3.

TABLE 3

| UL-DL Config- uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Table 4 lists in which subframe UL HARQ ACK/NACK corresponding to a PDSCH is transmitted again, according to the definition of Table 3, when the PDSCH is transmitted in each DL subframe (D) or special subframe (S) n, in each TDD UL-DL configuration.

TABLE 4

| Subframe n UL-DL Configuration | 0 | 1 | 2 | 3 | 4 | 5 | 6 | 7 | 8 | 9 |
|---|---|---|---|---|---|---|---|---|---|---|
| 0 | D 4 | S 6 | U | U | U | D 4 | 5 6 | U | U | U |
| 1 | D 6 | 5 | U | U | D 4 | D 7 | 5 6 | U | U | D 4 |
| 2 | D 7 | 5 6 | U | D 4 | D 8 | D 7 | 5 6 | U | D 4 | D 8 |
| 3 | D 4 | S 11 | U | U | U | D 7 | D 6 | D 6 | D 5 | D 5 |
| 4 | D 12 | S 11 | U | U | D 8 | D 7 | D | D 6 | D 5 | D 4 |
| 5 | D 12 | S 11 | U | D 9 | D 8 | D 7 | D 6 | D 5 | D 4 | D 13 |
| 6 | D | S | U | U | U | D 7 | S 7 | U | U | D 5 |

Figure 2:
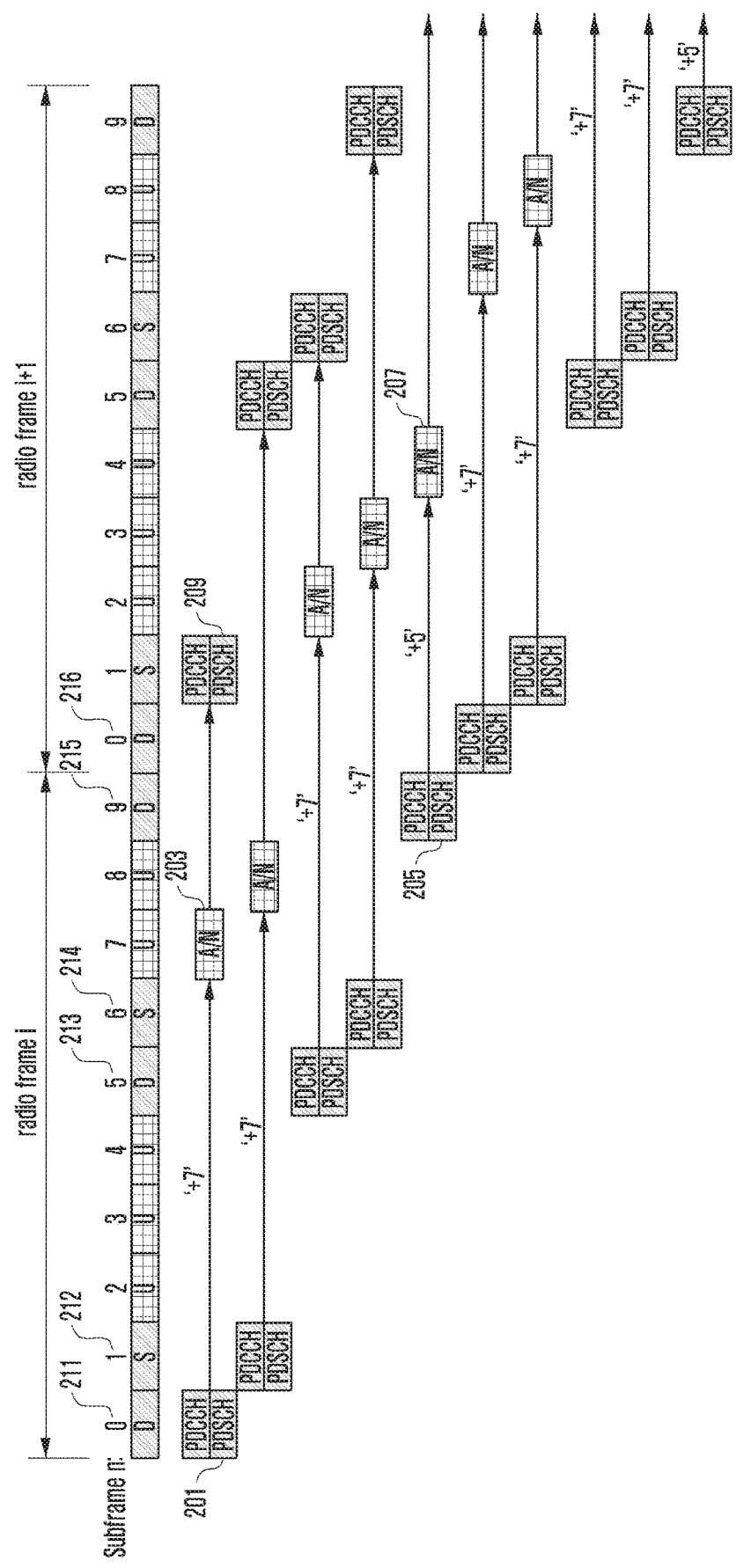
FIG. 2 is a diagram illustrating an operation example of a subframe in an LTE TDD frame according to an embodiment of the disclosure.

FIG. 2 is a diagram illustrating an operation example of a subframe in a TDD frame according to an embodiment of the disclosure.

Table 4 is described as follows with reference to FIG. 2. Referring to FIG. 2 is a diagram illustrating in which subframe UL HARQ ACK/NACK corresponding to a PDSCH is transmitted, when the PDSCH is transmitted in each DL or special subframe in the TDD UL-DL configuration #6 of Table 4, based on the definition of Table 4.

For example, a UE transmits, in the subframe #7 of a radio frame i, UL HARQ ACK/NACK corresponding to a PDSCH 201 transmitted by a BS in the subframe #0 of the radio frame i (203). In this case, downlink control information (DCI) including scheduling information for the PDSCH 201 is transmitted through a PDCCH M the same subframe as the subframe in which the PDSCH is transmitted. For another example, a UE transmits, in the subframe #4 of a radio frame i+1, UL HARQ ACK/NACK corresponding to a PDSCH 205 transmitted by a. BS in the subframe #9 of a radio frame i (207). Likewise, DCI including scheduling information for the PDSCH 205 is transmitted through a PDCCH in the same subframe as the subframe in which the PDSCH is transmitted.

In an LTE system, a DL HARQ adopts an asynchronous HARQ method whose data retransmission timing is not fixed. That is, if a BS receives, from a UE, NACK as feedback on HARQ-initial transmission data transmitted by the UE, the BS freely determines transmission timing of next HARQ retransmission data based on a scheduling operation. As a result of the decoding of received data for an HARQ operation, the UE buffers HARQ data determined to be an error, and then performs combining with next HARQ retransmission data. In this case, in order to maintain the reception buffer capacity of the UE within a given limit, a maximum number of DL HARQ processes are defined for each TDD UL-DL configuration as in Table 5. One HARQ process is mapped to one subframe in the time domain.

TABLE 5

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

Referring to FIG. 2, a UE decodes the PDSCH 201 transmitted by the BS in the subframe #0 of the radio frame i, and transmits NACK in the subframe #7 of the radio frame i if a result of the decoding is determined to be an error (203). When receiving the NACK, the BS configures retransmission data for the PDSCH 201 in a PDSCH 209 and transmits the PDSCH and the PDCCH together. The example of FIG. 2 illustrates that the retransmission data is transmitted in the subframe #1 of the radio frame i+1 by incorporating that a maximum number of DL HARQ processes of the TDD UL-DL configuration #6 is 6 based on the definition of Table 5. That is, a total of 6 DL HARQ processes 211, 212, 213, 214, 215, and 216 are present between the initial transmission PDSCH 201 and the retransmission PDSCH 209.

In an LTE system, unlike a DL HARQ, an UL HARQ adopts a synchronous HARQ method whose data transmission timing is fixed. That is, UL/DL timing relations between a physical uplink shared channel (PUSCR), that is, a physical channel for UL data transmission, and a PDCCH, that is, a DL control channel ahead of the PUSCH, and a physical hybrid indicator channel (PHICH), that is, a physical channel in which DL HARQ ACK/NACK corresponding to the PUSCH is transmitted, are fixed by the following rule.

When receiving, from a BS, a PDCCH including UL scheduling control information transmitted by the BS or a PHICH in which DL HARQ ACK/NACK is transmitted by the BS in a subframe n, a TIE transmits UL data, corresponding to the control information, in a subframe n+k, through a PUSCH. In this case, the k is defined in Table 6.

TABLE 6

| TDD UL/DL Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | 4 | 4 | |
| 4 | | | | | | | | 4 | 4 | |
| 5 | | | | | | | | | 4 | |
| 6 | | 7 | 7 | | | | 7 | 7 | | 5 |

Furthermore, when the UE receives, from the BS, a PHICH on which DL HARQ ACK/NACK is carried in a subframe i, the PHICH corresponds to the PUSCH transmitted by the UE in a subframe i-k. In this case, the k is defined in Table 7.

TABLE 7

| TDD UL/DL Configuration | DL subframe number 1 | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | 6 | 6 | |
| 4 | | | | | | | | 6 | 6 | |
| 5 | | | | | | | | | 6 | |
| 6 | | 6 | 4 | | | | 7 | 4 | | 6 |

Figure 3:
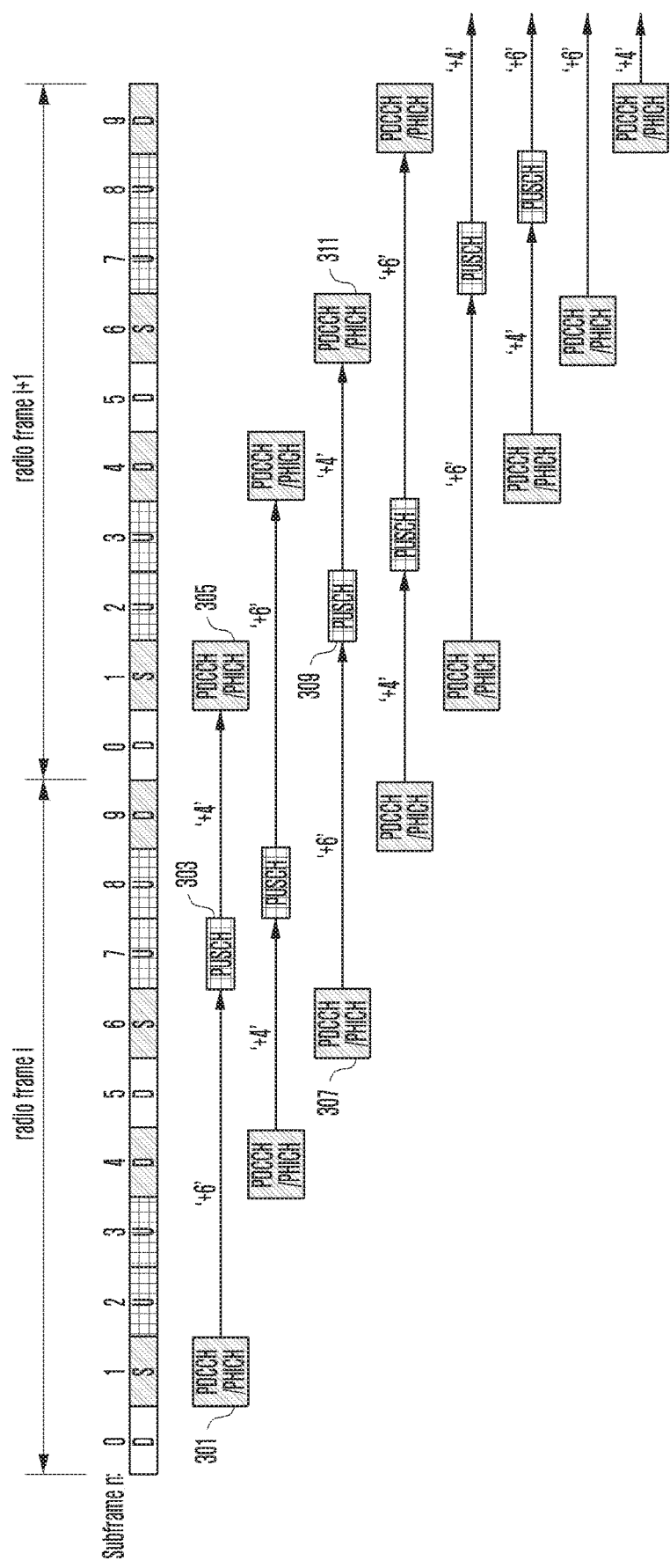
FIG. 3 is a diagram illustrating another operation example of a subframe in an LTE TDD frame according to an embodiment of the disclosure.

FIG. 3 is a diagram illustrating another operation example of a subframe in a TDD frame according to an embodiment of the disclosure.

In particular, FIG. 3 is a diagram illustrating in which subframe an UL PUSCH corresponding to a PDCCH or PHICH is transmitted and in which subframe a PHICH corresponding to the PUSCH is transmitted again, when the PDCCH or PHICH is transmitted in each DL or special subframe, respectively, in the TDD UL-DL configuration #1, based on the definitions of Tables 6 and 7.

Referring to FIG. 3, for example, a UE transmits, in the subframe #7 of the radio frame i, an UL PUSCH corresponding to a PDCCH or PHICH 301 transmitted by a BS in the subframe #1 of the radio frame i (303). Furthermore, the BS transmits, to the UE, a PHICH or PDCCH corresponding to the PUSCH in the subframe #1 of a radio frame i+1 (305). For another example, a UE transmits, in the subframe #2 of the radio frame i+1, an UL PUSCH corresponding to a PDCCH or PHICH 307 transmitted by a BS in the subframe #6 of the radio frame i (309). Furthermore, the BS transmits, to the UE, a PHICH or PDCCH corresponding to the PUSCH in the subframe #6 of the radio frame i+1 (311).

In an LTE TDD system, a minimum transmission/reception processing time of a BS and a UE is guaranteed by limiting the DL transmission of a PDCCH or PHICH corresponding to a PUSCH in a specific DL subframe in relation to PUSCH transmission. For example, in the case of the TDD UL-DL configuration #1 of FIG. 3, a PDCCH corresponding to or the PUSCH or a PHICH for scheduling the PUSCH is not transmitted in the subframes #0 and #5 in the DL.

Meanwhile, as a communication system after LTE, that is, a 5G radio cellular communication system (hereinafter referred to as 5G or an NR in this specification) may support services that satisfy various requirements because it has to freely incorporate various requirements of users and service providers.

Accordingly, 5G may be defined as a technology for satisfying requirements selected for 5G-oriented services, among requirements such as a UE maximum transfer rate of 20 Gbps, a UE maximum speed of 500 km/h, a maximum latency time of 0.5 ms, a UE access density of 1,000,000 UE/km$^2$ with respect to various 5G-oriented services, such as enhanced mobile broadband (eMBB) communication (hereinafter called eMBB in this specification), massive machine type communication (mMTC) (hereinafter called mMTC in this specification), and ultra-reliable and low latency communications (URLLC) (hereinafter called URLLC in this specification).

For example, in 5G, in order to provide the eMBB, a UE maximum transfer rate of 20 Gbps in the DL and a UE maximum transfer rate of 10 Gbps in the UL need to be provided from a viewpoint of one BS. Furthermore, an average transfer rate of a UE which may be actually felt needs to be increased. In order to satisfy such requirements, a transmission and reception technology including a further improved multiple-input multiple-output transmission technology needs to be improved.

Furthermore, mMTC is taken into consideration in order to support application services, such as Internet of thing (IoT), in 5G. mMTC requires requirements, such as the support of access by many UEs within a cell, the improvement of coverage of a UE, an improved battery time, and a reduction of the cost of a UE, in order to efficiently provide the IoT. The IoT needs to support a large number of UEs (e.g., 1,000,000 UE/km$^2$) within a cell because the IoT is applied to several sensors and various devices and supports communication functions. Furthermore, mMTC has a good possibility that from the nature of its service, a UE will be located in a shadow area, such as the basement of a building or an area not covered by a cell, and thus requires wider coverage than coverage provided by eMBB mMTC has a good possibility that it will be configured with cheap UEs, and thus requires a very long battery life time because it is difficult to frequently change the battery of the UE.

Finally, URLLC is cellular-based wireless communication used for a specific purpose, and has to provide communication for ultra-low latency and ultra-reliability, as services used for remote control for a robot or a machine, industry automation, an unmanned aviation device, remote health control, and emergency situation notification. For example, URLLC needs to satisfy a maximum latency time smaller than 0.5 ms and also has requirements that need to provide a packet error rate of 10$^{-5}$ or less. Accordingly, for URLLC, a transmit time interval (TTI) smaller than that of a 5G service, such as eMBB, needs to be provided. Furthermore, a design for allocating a wide resource in a frequency band is required.

Services taken into consideration in the aforementioned 5G radio cellular communication system need to be provided as one framework. That is, for efficient resource management and control, the services need to be integrated, controlled and transmitted as one system, rather than being independently operated.

Figure 4:
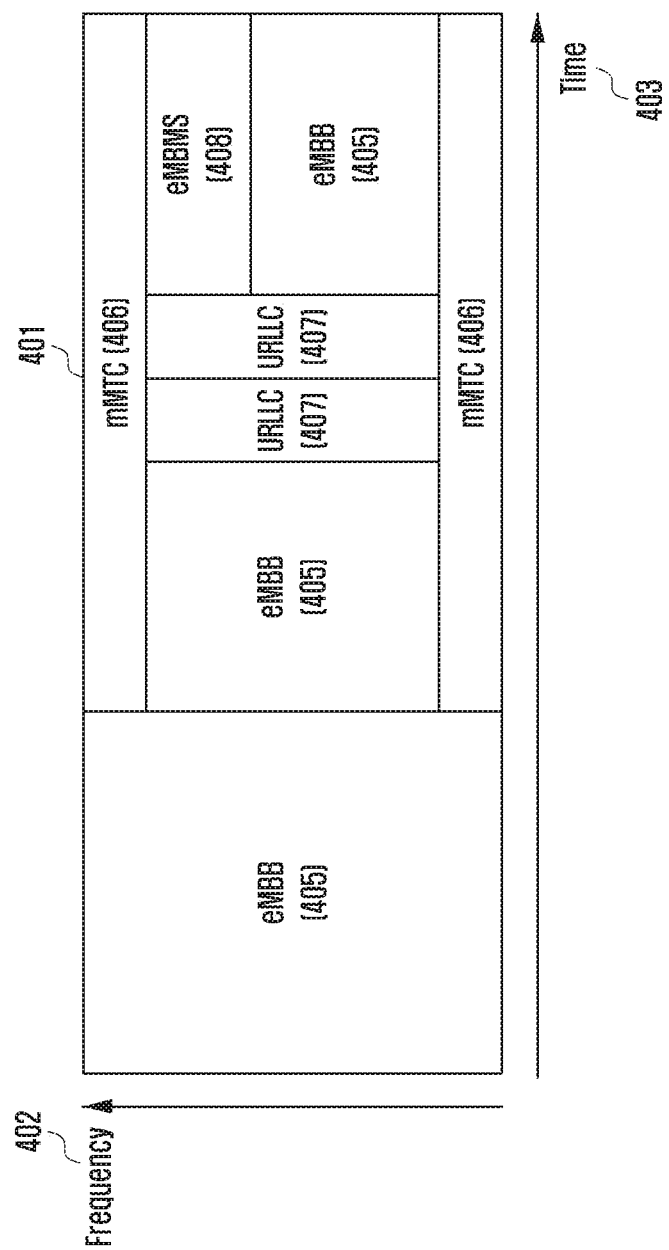
FIG. 4 is a diagram illustrating an example in which 5G services are multiplexed and transmitted in one system according to an embodiment of the disclosure.

FIG. 4 is a diagram illustrating an example in which services taken into consideration in 5G are multiplexed and transmitted in one system according to an embodiment of the disclosure.

Referring to FIG. 4, a frequency time resource 401 used by 5G may be configured with a frequency axis 402 and a time axis 403. FIG. 4 illustrates that 5G operates eMBB 405, mMTC 406, and URLLC 407 within one framework. Furthermore, in 5G, enhanced mobile broadcast/multicast service (eMBMS) 408 for providing cellular-based broadcasting services may be taken into consideration as a service which may be additionally taken into consideration. Services taken into consideration in 5G, such as the eMBB 405, the mMTC 406, the URLLC 407, and the eMBMS 408, may be multiplexed and transmitted through time-division multiplexing (TDM) or frequency division multiplexing (FDM) within a single system frequency bandwidth operating in 5G. Furthermore, spatial division multiplexing may also be taken into consideration. The eMBB 405 may occupy a maximum frequency bandwidth and be transmitted at a specific given time in order to provide the aforementioned increased data transfer rate. Accordingly, the eMBB 405 service may be TDMed with another service and transmitted within the system transmission bandwidth 401, and may be FDMed with other services and transmitted within the system transmission bandwidth according to the necessity of other services.

The mMTC 406 requires an increased transmission interval in order to secure wide coverage unlike other services, and may secure coverage by repeatedly transmitting the same packet within the transmission interval. Furthermore, in order to reduce the complexity of a UE and a UE price, a transmission bandwidth which may be received by a UE is limited. When such requirements are taken into consideration, the mMTC 406 may be FDMed with other services and transmitted within the transmission system bandwidth 401 of 5G.

The URLLC 407 may have a short transmit time interval (TTI) compared to other services in order to satisfy ultra-latency requirements required for services. Furthermore, the URLLC 407 may have a wide bandwidth on the frequency side because it has to have a low coding rate in order to satisfy ultra-reliability requirements. When the requirements of the URLLC 407 are taken into consideration, the URLLC 407 may be TDMed with other services within the transmission system bandwidth 401 of 5G.

Each of the aforementioned services may have a different transmission and reception scheme and a different transmission and reception parameter in order to satisfy the requirements of each service. For example, each of the services may have a different numerology depending on its service requirements. In this case, the numerology includes a cyclic prefix (CP) length, a subcarrier spacing, the length of an OFDM symbol, a transmission time interval (TTI), etc. in a communication system based on orthogonal frequency division multiplexing (OFDM) or orthogonal frequency division multiple access (OFDMA). As an example in which the services have different numerologies, the eMBMS 408 may have a longer CP length than other services. The eMBMS transmits higher traffic based on broadcasting, and thus may transmit the same data in all cells.

In this case, from a standpoint of a UE, when signals received from a plurality of cells arrive within a CP length, the UE can obtain a single frequency network (SFN) diversity gain because the UE can receive and decode all the signals. Accordingly, there is an advantage in that even a UE located at a cell boundary can receive broadcasting information without a coverage restriction. However, in supporting the eMBMS in 5G, the eMBMS is wasted due to CP overhead if the CP length is relatively longer than that of other services. Furthermore, a long OFDM symbol length is required compared to another service, which also requires a narrower subcarrier spacing compared to another service.

Furthermore, as an example in which different numerologies are used between services in 5G, the URLLC may require a shorter OFDM symbol length and also require a wider subcarrier spacing because it requires a smaller TTI than another service.

Meanwhile, in 5G, one TTI may be defined as one slot, and may be configured with 14 OFDM symbols or 7 OFDM symbols. Accordingly, in the case of a subcarrier spacing of 15 KHz, one slot has a length of 1 ins or 0.5 ms. Furthermore, in 5G, for urgent transmission and transmission in an unlicensed band, one TTI may be defined as one mini-slot or sub-slot. One mini-slot may have the number of OFDM symbols equal to (total number of OFDM symbols of a slot-1) from 1. If the length of one slot corresponds to 14 OFDM symbols, the length of a mini-slot may be determined among OFDM symbols 1 to 13. The length, format, and repetition form of the slot or mini-slot may be defined in the standard or may be transmitted by a higher signal or system information or a physical signal and received by a UE. Furthermore, instead of the mini-slot or sub-slot, a slot may be determined among OFDM symbols 1 to 14. The length of the slot may be transmitted by a higher signal or system information and received by a UE.

A slot or a mini-slot may be defined to have various transmission formats, and may be classified into the following formats.

DL only slot (or full DL slot): the DL only slot includes only a DL interval, and only DL transmission is supported.

DL centric slot: the DL centric slot includes a DL interval, a GP (or flexible symbol), and an UL interval. The number of OFDM symbols of the DL interval is greater than the number of OFDM symbols of the UL interval.

UL centric slot: the UL centric slot includes a DL interval, a GP (or flexible symbol), and an UL interval. The number of OFDM symbols of the DL interval is smaller than the number of OFDM symbols of the UL interval.

UL only slot (or full UL slot): the UL only slot includes only an UL interval, and only UL, transmission is supported.

Only the slot formats have been classified, but the mini-slot may also be classified according to the same classification method, That is, the mini-slot formats may be classified into a DL only mini-slot, a DL centric mini-slot, an UL centric mini-slot, a UL only mini-slot, etc. In the above description, the flexible symbol may be used as a guard symbol for transmission and reception switching, and may also be used for a purpose for channel estimation.

Hereinafter, in specifically describing embodiments of the disclosure, LTE and 5G systems will be main targets, but a main gist of the disclosure may be slightly changed without greatly departing from the scope of the disclosure, and may be applied to other communication systems having a similar technical background and channel form. This may be determined by a person having skilled knowledge in the art to which the disclosure pertains.

In order to stably support the mobility of a UE in the existing mobile communication system while satisfying the aforementioned requirements of the 5G system such as an ultra-high-speed data service and ultra-low latency service, a configuration of an integrated system through a combination of the beamforming technology operating in an ultra-high frequency band, a new radio access technology (new RAT) adopting a short TTI, and an LTE/LTE-A system operating in a relatively low frequency band is necessary. In this case, the new radio access technology functions to satisfy the requirements of the 5G system, and the LTE/LTE-A system functions to stably support the mobility of a UE.

Figure 5:
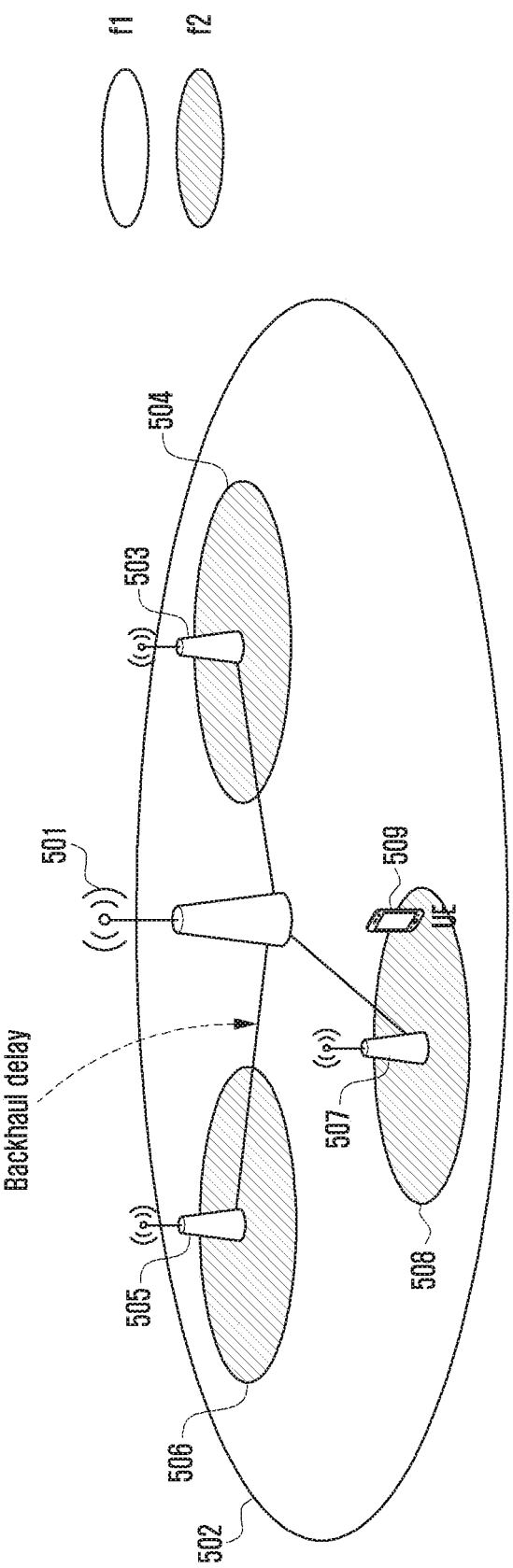
FIG. 5 is a diagram illustrating an example of a configuration of a communication system to which the disclosure is applied according to an embodiment of the disclosure.

FIG. 5 is a diagram illustrating one example of a configuration of a communication system to which the disclosure is applied, and is a diagram illustrating one example of a configuration of an integrated system in which a BS responsible for a new radio access technology and an LTE/LTE-A BS are combined according to an embodiment of the disclosure.

Referring to FIG. 5, small BSs 503, 505, and 507 of relatively small coverage 504, 506, and 508 may be deployed within the coverage 502 of a macro BS 501. In general, the macro BS 501 can transmit a signal using relatively greater transmit power than each of the small BSs 503, 505, and 507, and thus the coverage 502 of the macro BS 501 is relatively larger than each of the coverage 504, 506, and 508 of the small BSs 503, 505, and 507. As an example, in the example of FIG. 5, the macro BS may indicate an LTE/LTE-A system operating in a relatively low frequency band, and each of the small BSs 503, 505, and 507 may indicate a system to which a new radio access technology (NR or 5G) operating in a relatively high frequency band has been applied.

The macro BS 501 and the small BSs 503, 505, and 507 are interconnected, and may have given backhaul delay depending on a connection state. Accordingly, to exchange information sensitive to transmission latency between the macro BS 501 and the small BSs 503, 505, and 507 may not be preferred.

Meanwhile, the example of FIG. 5 illustrates carrier aggregations between the macro BS 501 and the small BSs 503, 505, and 507, but the disclosure is not limited thereto and may be applied to a carrier aggregation between given BSs located at geographically different places. For example, in some embodiments, the disclosure may be applied to both a carrier aggregation between macro BSs located at different places and a carrier aggregation between small BSs located at different places. Furthermore, the number of combined carriers is not limited. Alternatively, the disclosure may be applied to a carrier aggregation within the macro BS 501 and a carrier aggregation within each of the small. BSs 503, 505, and 507.

Referring to FIG. 5, the macro BS 501 may use a frequency f1 for DL signal transmission, and the small BSs 503, 505, and 507 may use a frequency f2 for DL signal transmission. In this case, the macro BS 501 may transmit data or control information to a given UE 509 through the frequency f1, and the small BSs 503, 505, and 507 may transmit data or control information through the frequency f2. Through the above carrier aggregation, a BS that adopts the new radio access technology capable of supporting an ultra-wide band in a high frequency band may provide an ultra-high speed data service and ultra-low latency service, and a BS that adopts the LTE/LTE-A technology in a relatively low frequency band along with the new radio access technology may stably support the mobility of a UE.

Meanwhile, the configuration illustrated in FIG. 5 may be likewise applied to an UL carrier aggregation in addition to a DL carrier aggregation. For example, the UE 509 may transmit data or control information to the macro BS 501 through a frequency f1' for UL signal transmission. Furthermore, the UE 509 may transmit data or control information to the small BSs 503, 505, and 507 through a frequency f2' for UL signal transmission. The f1' may correspond to the f1, and the f2' may correspond to the f2. The UL signals of the UE may be transmitted to the macro BS and the small BS at different timing or may be simultaneously transmitted. In either case, a total sum of UL transmit power of the UE at given timing needs to be maintained within a given threshold value due to a physical restriction on the power amp device of the UE and the regulation of radio waves for UE transmit power.

In an environment such as that illustrated in FIG. 5, a UE (509) operation of accessing the macro BS 501 and the small BSs 503, 505, and 507 and performing communication is called dual connectivity (DC). If the UE performs dual connectivity, the following two configuration schemes are possible.

In the first configuration scheme, after performing initial access to the macro BS 501 operating as an LTE/LTE-A system, the UE receives configuration information for data transmission to and reception from the macro BS through a higher signal (system or RRC signal). Thereafter, the UE receives configuration information for data transmission to and reception from the small BSs 503, 504, and 505 operating as NR systems through a higher signal (system or RRC signal) of the macro BS 501, and performs random access to the small BSs 503, 504, and 505, thus becoming a dual connectivity state in which the UE can transmit and receive data to and from the macro BS 501 and the small BSs 503, 504, and 505. In this case, the macro BS 501 operating as the LTE/LTE-A system is called a master cell group (MCG), and the small BSs 503, 504, and 505 operating as the NR systems are called a secondary cell group (SCG) When the UE is in the dual connectivity state based on the first configuration scheme, it may be represented that the UE has been configured with an MCG using E-UTRA radio access (or LTE/LTE-A) and an SCG using NR radio access. Alternatively, it may be represented that the UE has been configured with E-UTRA NR dual connectivity (EN-DC).

In the second configuration scheme, after performing initial access to the small BSs 503, 504, and 505 operating as the NR systems, the UE receives configuration information for data transmission to and reception from the small BS through higher signal (system or RRC signal). Thereafter, the UE receives configuration information for data transmission to and reception from the macro BS 501 operating as the LTE/LTE-A system through a higher signal (system or RRC signal) of the small BSs 503, 504, and 505, and performs random access to the macro BS 501, thus becoming a dual connectivity state in which the UE can transmit and receive data to and from the small BSs 503, 504, and 505 and the macro BS 501. In this case, the small BSs 503, 504, and 505 operating as the NR systems are called an MCG, and the macro BS 501 operating as the LTE system is called an SCG. When the UE is in the dual connectivity state based on the second configuration scheme, it may be represented that the UE has been configured with an MCG using NR radio access and an SCG using E-UTRA radio access (or LTE/LTE-A). Alternatively, it may be represented that the UE has been configured with NR E-UTRA dual connectivity (NE-DC).

Hereinafter, embodiments described in the disclosure are proposed by taking the first dual connectivity configuration scheme and the second dual connectivity configuration scheme into consideration. That is, the disclosure proposes another embodiment depending on whether LTE cells using E-UTRA correspond to an MCG or an NR cell using the NR is an MCG. Another embodiment is proposed depending on whether LTE cells using E-UTRA correspond to an MCG or an NR cell using the NR is an MCG because importance needs to be assigned to UL transmission to the MCG rather than UL transmission to the SCG when the UE is in the dual connectivity state. Furthermore, timing for UL transmission to a cell using the NR (e.g., PDCCH versus PUSCH transmission timing or PDCCH versus PUCCH transmission timing) may be differently indicated through a higher signal configuration and an indication in a PDCCH. Timing for UL transmission to a cell using LTE (e.g., PDCCH versus PUSCH transmission timing or PDCCH versus PUCCH transmission timing) is fixed. Accordingly, embodiments of the disclosure are proposed by taking such conditions into consideration.

<Scheme for Performing, by a UE, UL Transmission Depending on Whether the UE has a Dynamic Power Sharing Capability in a Situation in which LTE TDD is a Primary Cell and the NR is a Secondary Cell>

Various embodiments of a scheme for performing, by the UE, UL transmission depending on whether the LTE has a dynamic power sharing capability if a UE is configured with E-UTRA NR dual connectivity (EN-DC) in which LTE TDD is a primary cell and the NR is a secondary cell are described through the following description and FIGS. 6, 7, 8, 9, and 10.

If the UE is configured with the EN-DC, that is, if the UE is configured with an MCG using E-UTRA radio access and an SCG using NR radio access, the UE may receive a configuration for a maximum power value of the UL for LTE and a maximum power value of the UL for NR from an LTE BS or an NR BS. Furthermore, the UE may receive a configuration for a maximum power value for an EN-DC operation from the LTE BS or the NR BS. In this case, when the sum of the maximum power value of the UL for LTE and the maximum power value of the UL for NR is greater than the maximum power value for the EN-DC operation, the UE may apply one of the following two power sharing methods.

The first method is semi-static power sharing between an MCG (LTE) and an SCG (NR).

When a UE receives a reference IDD configuration that limits LTE UL transmission only in a specific subframe for LTE UL transmission, if the UE does not indicate or report a dynamic power sharing capability to a BS, the UE does not expect UL transmission in a slot of NR matched with a time interval in which LTE is an UL subframe based on the reference TDD configuration (or does not expect a configuration or scheduling indicative of NR UL transmission from an NR BS). All subframes configured to perform LTE UL transmission may be moved by the HARQ offset by adding an HARQ offset in addition to the reference TDD configuration. If a subframe in which LTE UL transmission is performed based on a reference TDD configuration is #2, when an HARQ offset configured in a UE is 1, the UE may determine a subframe in which LTE UL transmission is performed, as a subframe #3, by adding the HARQ offset 1 to #2, that is, the subframe index. The UE may receive the HARQ offset through a higher signal. Thereafter, although not separately described in the disclosure, the HARQ offset may be applied to the reference TDD configuration, described in the disclosure, in the same manner as that described above.

The second method is dynamic power sharing between an MCG (LTE) and an SCG (NR).

If a UE indicates or reports the dynamic power sharing capability to a. BS, when LTE UL transmission and NR UL transmission of the UE collide against each other and the sum of power for the LTE UL transmission and power for the NR UL transmission is greater than the maximum power value for the EN-DC operation, the UE may drop the NR UL transmission as the first scheme. Alternatively, as the second scheme, the UE may reduce NR UL transmit power so that the sum of power for LTE UL transmission and power for NR UL transmission is smaller than the maximum power value for the EN-DC operation. When the NR UL transmit power is reduced, if the transmit power to be reduced is greater than X, the UE may drop NR transmission. When the transmit power to be reduced is smaller than X, the UE may perform the NR UL transmission using the reduced transmit power.

In the first or second method, a UE may report, to a BS, a capability not supporting simultaneous UL transmission through a higher signal. Alternatively, a UE may report a capability, not supporting simultaneous UL transmission, with respect to a specific band combination including an LTE TDD cell or carrier and an NR cell or carrier through a higher signal.

Figure 6:
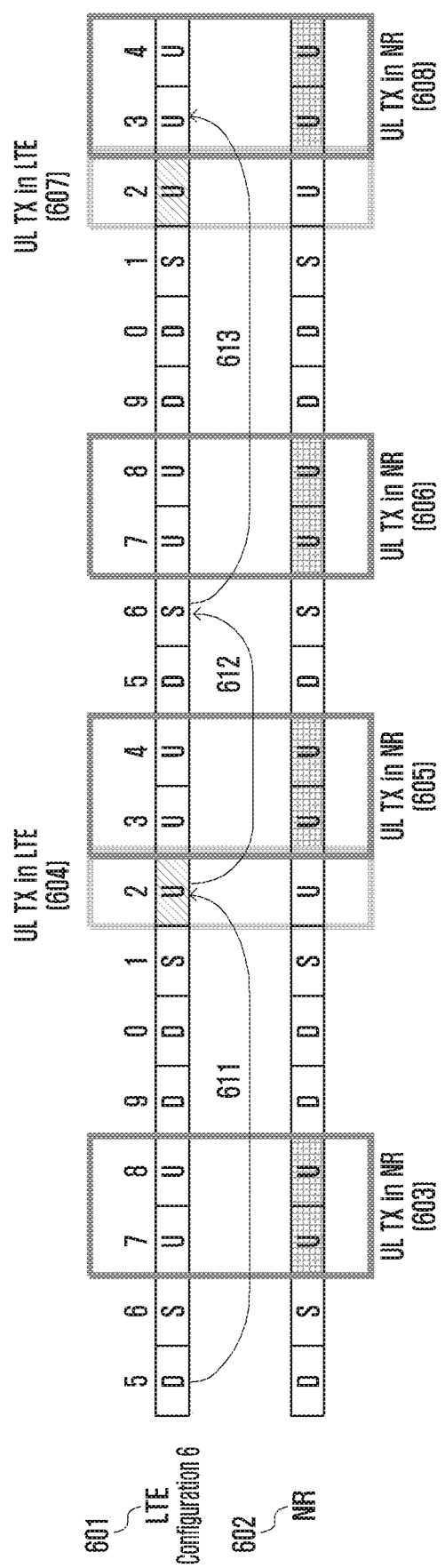
FIG. 6 is a diagram illustrating the first problem situation to be solved according to an embodiment of the disclosure.

FIG. 6 is a diagram illustrating the first problem situation to be solved according to an embodiment of the disclosure.

Referring to FIG. 6, LTE 601 is an MCG and operated as TDD, and NR 602 is an SCG. Accordingly, the first problem situation may be applied to a case where a UE is configured with EN-DC. In FIG. 6, the TDD cell of the LTE 601 is a IDD UL-DL configuration #6 (e.g., this describes a TDD UL-DL configuration #6 situation, but the disclosure is not limited thereto). An EN-DC UE may be aware of the locations of an UL subframe, a special subframe, and a DL subframe by receiving the IDD UL-DL configuration #6 from system information. The EN-DC UE may receive information on the UL or DL of the NR 602 or the locations or number of flexible slots and OFDM symbols through system information, higher information, or a physical layer signal.

A problem situation is described with reference to FIG. 6 by taking into consideration a situation in which the EN-DC UE operates to perform semi-static power sharing between the LTE 601 and the NR 602. That is, a situation is assumed in which the EN-DC UE receives a configuration for a reference TDD configurations #5 among reference TDD configurations #2, #4, and #5 capable of limiting LTE UL transmission only in a specific subframe for LTE UL transmission, and does not indicate or report a dynamic power sharing capability to an LTE or NR BS. In this case, the EN-DC UE may be aware that it can perform LTE UL transmission only in a UL subframe #2 matched with an UL subframe based on the reference TDD configuration #5, among the UL subframes #2, #3, #4, #7, and #8 of the TDD UL-DL configuration #6 of the LTE 601 received from the system information (604 and 607), and can perform NR UL transmission in a slot of the NR matched with the time interval of the remaining UL subframes #3, #4, #7, and #8 (603, 605, 606, and 608) (refer to Tables 3 and 4).

If the EN-DC UE follows an UL HARQ timing relation between PDCCH transmission and PUSCH transmission defined in the given TDD UL-DL configuration #6 from the system information of the LTE 601 with respect to UL data transmission (refer to Tables 6 and 7), the EN-DC UE performs PUSCH transmission in the UL subframe #2 based on the scheduling of a PDCCH received from an LTE BS in the DL subframe #5 of the LTE 601 (611), receives ACK/NACK for the PUSCH or a PDCCH from the LTE BS in the special subframe #6 (612), and transmits a corresponding retransmission PUSCH in a UL subframe #3 (613). A time interval corresponding to the UL subframe #3 is an interval in which only NR UL transmission is possible. Accordingly, there is a problem in that NR UL transmission and LTE UL transmission collide against each other if the above PUSCH retransmission of the EN-DC UE occurs. Accordingly, the disclosure provides a scheme for solving the above problem through embodiments 1 and 2.

A problem situation is described with reference to FIG. 6 by taking into consideration a situation in which the EN-DC UE operates to perform dynamic power sharing between the LTE 601 and the NR 602. That is, if the EN-DC UE indicates or reports the dynamic power sharing capability to a BS, the disclosure provides a scheme for solving, by the EN-DC UE, the problem through an embodiment 3 if LTE UL transmission and NR UL transmission of the UE collide against each other as in 604 of FIG. 6 in the time interval of the UL subframe #2 on which restrictions have been imposed so that LTE UL transmission is performed based on a reference TDD configuration or the sum of power for the LTE UL transmission and power for the NR UL transmission is greater than a maximum power value for an EN-DC operation. Furthermore, the disclosure provides a scheme for solving, by the EN-DC UE, the problem through an embodiment 4 if LTE UL transmission and NR UL transmission of the UE collide against each other as in 608 of FIG. 6 in UL subframes #3, #4, #7, and #8, that is, time intervals except the UL subframe #2 on which restrictions have been imposed so that LTE UL transmission is performed based on a reference TDD configuration or the sum of power for the LTE UL transmission and power for the NR UL transmission is greater than a maximum power value for an EN-DC operation.

Embodiment 1

Figure 7:
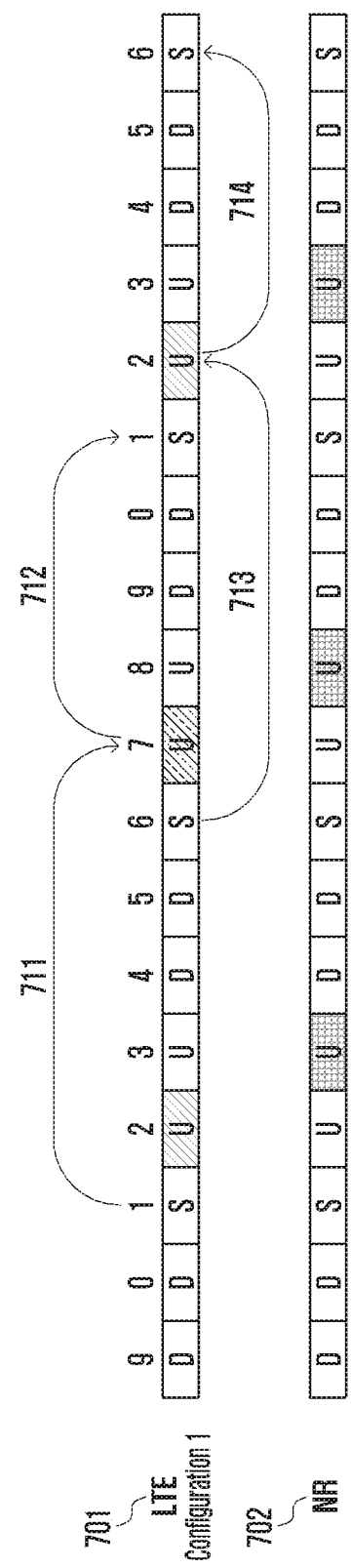
FIG. 7 is a diagram illustrating UL transmission according to an embodiment of the disclosure.

FIG. 7 is a diagram illustrating UL transmission according to an embodiment 1 of the disclosure.

Referring to FIG. 7, LTE 701 is an MCG and operated as TDD, and NR 702 is an SCG. Accordingly, the embodiment 1 may be applied to a case where a UE is configured with EN-DC. In FIG. 7, a TDD cell of the LTE 701 is a TDD UL-DL configuration #1, and the EN-DC UE may be aware of the locations of an UL subframe, a special subframe, and a DL subframe by receiving the TDD UL-DL configuration #1 from system information. The TDD UL-DL configuration #1 illustrated in FIG. 7 is merely an example, and does not limit the disclosure. The EN-DC UE may receive information on the UL or DL of the NR 702 or the locations or number of flexible slots and OFDM symbols through system information, higher information, or a physical layer signal. In FIG. 7, a situation in which the EN-DC UE operates to perform semi-static power sharing between the LTE 701 and the NR 702 is taken into consideration. That is, a situation is assumed in which the EN-DC UE receives a configuration for a reference TDD configuration #2 among reference TDD configurations #2, #4, and #5 capable of limiting LTE UL transmission only in a specific subframe for LTE UL transmission, and does not indicate or report a dynamic power sharing capability to an LTE or NR BS. In this case, the EN-DC UE may be aware that it may perform LTE UL transmission only in a UL subframe #2, #7 matched with an UL subframe based on the reference TDD configuration #2, among the UL subframes #2, #3, #7, and #8 of the TDD UL-DL configuration #1 of the LTE 701 received from system information, and may perform NR UL transmission in a slot of NR matched with the time intervals of the remaining UL subframes #3 and #8 (refer to Tables 3 and 4).

As described above, assuming that a TDD UL-DL configuration received from a LTE BS of the LTE 701 is one of #1, #2, #3, #4, and #5 except #0 and #6 and a reference TDD configuration received from the LTE BS or NR BS through a higher signal is one of #2, #4, and #5, if the EN-DC UE follows an UL HARQ timing relation between PDCCH transmission and PUSCH transmission defined in a TDD UL-DL configuration (the TDD UL-DL configuration #1 in FIG. 7) given by system information of the LTE 701 with respect to UL data transmission (refer to Tables 6 and 7), in the case of the EN-DC UE, UL subframes based on PDCCH reception, PUSCH transmission, and PUSCH retransmission occur in the same LTE UL subframe every radio frame (711, 712, 713, 714). Accordingly, a problem in that NR UL transmission and LTE UL transmission collide against each other when the above PUSCH retransmission of the EN-DC UE occurs does not occur.

Embodiment 2

Figure 8:
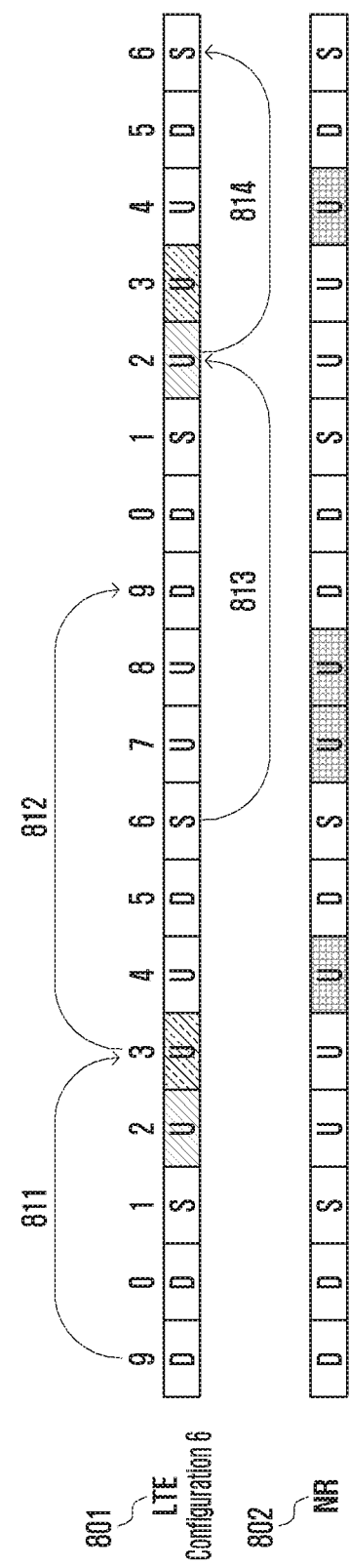
FIG. 8 is a diagram illustrating UL transmission according to an embodiment of the disclosure.

FIG. 8 is a diagram illustrating UL transmission according to an embodiment 2 of the disclosure.

Referring to FIG. 8, LTE 801 is an MCG and operated as TDD, and NR 802 is an SCG. Accordingly, the embodiment 2 may be applied to a case where a UE is configured with EN-DC. In FIG. 8, a TDD cell of the LTE 801 is a TDD UL-DL configuration #6, and the EN-DC UE may be aware of the locations of an UL subframe, a special subframe, and a DL subframe by receiving the TDD UL-DL configuration #6 from system information. The TDD UL-DL configuration #6 illustrated in FIG. 8 is merely an example, and does not limit the disclosure. The EN-DC UE may receive information on the UL or DL of the NR 802 or the locations or number of flexible slots and OFDM symbols through system information, higher information, or a physical layer signal. In FIG. 8, a situation in which the EN-DC UE operates to perform semi-static power sharing between the LTE 801 and the NR 802 is taken into consideration. That is, a situation is assumed in which the EN-DC UE receives a configuration for a reference TDD configuration #4 among reference TDD configurations #2, #4, and #5 capable of limiting LTE UL transmission only in a specific subframe for LTE UL transmission, and does not indicate or report a dynamic power sharing capability to an LTE or NR BS. In this case, the EN-DC UE may be aware that it may perform LTE UL transmission only in UL subframes #2 and #3 matched with an UL subframe based on the reference TDD configuration #4 among UL subframes #2, #3, #4, #7, and #8 of the TDD UL-DL configuration #6 of the LTE 801 received from system information, and may perform NR UL transmission in a slot of the NR matched with the time intervals of the remaining UL subframes #4, #7, #8 (refer to Tables 3 and 4).

As described above, if a TDD UL-DL configuration received from a LTE BS of the LTE 801 is one of #0 and #6 and a reference TDD configuration received from an LTE BS or NR BS through a higher signal is one of #2, #4, and #5, the disclosure proposes that the EN-DC UE follows an UL HARQ timing relation between PDCCH transmission and PUSCH transmission defined based on a specific another second reference TDD configuration, not a TDD UL-DL configuration given by system information of the LTE 801, with respect to UL data transmission (refer to Tables 6 and 7). In this case, in the case of the EN-DC UE, UL subframes based on PDCCH reception, PUSCH transmission, and PUSCH retransmission occur in the same LTE UL subframe every radio frame (811, 812, 813, and 814). Accordingly, a problem in that NR UL transmission and LTE UL transmission collide against each other when the above PUSCH retransmission of the EN-DC UE occurs does not occur.

The second reference TDD configuration for defining the UL HARQ timing relation may be defined so that UL subframes based on the PDCCH reception, PUSCH transmission, and PUSCH retransmission of the EN-DC UE occur in the same LTE UL subframe every radio frame, and may be defined using the following method, for example.

If a TDD UL-DL configuration of system information received from an LTE BS is #6 and a reference TDD configuration is one of #2, #4, and #5, the second reference TDD configuration for UL HARQ timing may be determined as #1.

If a TDD UL-DL configuration of system information received from an LTE BS is #0 and a reference TDD configuration is one of #2 and #5, the second reference TDD configuration for UL HARQ timing may be determined as #1.

If a TDD UL-DL configuration of system information received from an LTE BS is #0, a reference TDD configuration is #4, and a second reference TDD configuration #1 for UL HARQ timing is followed, a PDCCH for scheduling the PUSCH of a UL subframe #3 needs to be transmitted in the DL subframe #9 of a previous radio frame. However, there is a problem in that the PDCCH cannot be transmitted because the subframe #9 is UL in the UL-DL configuration #0.

Accordingly, if a. TDD UL-DL configuration of system information received from an LTE BS is #0 and a reference TDD configuration is #4, the following proposal is possible.

First, a second reference TDD configuration for UL HARQ timing is #1, but the EN-DC UE may not expect the scheduling of a PUSCH in the UL subframe #3 of LTE.

Second, a second reference TDD configuration for UL HARQ timing in an UL subframe #2 is #1, but the EN-DC UE may expect that a PDCCH for scheduling a PUSCH in an UL subframe #3 is transmitted in the DL subframe #5 of a previous radio frame.

Third, if a TDD UL-DL configuration of system information received from an LTE BS is #0, the EN-DC UE may not expect a reference TDD configuration #4. That is, the UE may expect only a case where a reference TDD configuration is configured as #2 or #5.

Unlike in the proposals, an EN-DC UE may not expect that an UL-DL configuration from system information is #0 or #6, from the beginning. That is, the EN-DC UE does not expect a configuration, such as that of the embodiment 2, may receive one of only TDD UL-DL configurations #1, #2, #3, #4, and #5 from system information, and may receive one of reference TDD configurations #2, #4, and #5 from a higher signal. The second reference TDD configuration for UL HARQ timing is defined as #1.

Embodiment 3

Referring to FIG. 6, if the EN-DC UE operates to perform dynamic power sharing between the LTE 601 and the NR 602, that is, if the EN-DC UE indicates or reports the dynamic power sharing capability to a BS, the disclosure proposes schemes for solving, by the EN-DC UE, the problem through the embodiment 3, if LTE UL transmission and NR UL transmission of the UE collide against each other in the time interval of a UL subframe #2 on which restrictions have been imposed so that LTE UL transmission is performed based on a reference TDD configuration as in 604 of FIG. 6 or the sum of power for the LTE UL transmission and power for the NR UL transmission is greater than a maximum power value for an EN-DC operation.

According to the first scheme, the EN-DC UE performs only LTE UL transmission, and always drops NR UL transmission. Since LTE UL transmission playing a role as an MCG can be protected using the above scheme, a connection with the MCG can be maintained, and important information necessary for an RRC connection can be transmitted to and received from the MCG.

According to the second scheme, the EN-DC UE maintains power for LTE UL transmission, and reduces power for NR UL transmission so that the sum of power for LTE UL transmission and power for NR UL transmission is equal to or smaller than the set maximum power value for an EN-DC operation. Since LTE UL transmission playing a role as an MCG can be protected using the above scheme, a connection with the MCG can be maintained, and important information necessary for an RRC connection can be transmitted to and received from the MCG. Furthermore, NR UL transmission may be performed within EN-DC maximum power.

Embodiment 4

Referring to FIG. 6, if an EN-DC UE operates to perform dynamic power sharing between the LTE 601 and the NR 602, that is, if the EN-DC UE indicates or reports the dynamic power sharing capability to a BS, the disclosure proposes schemes for solving, by the EN-DC UE, the problem through the embodiment 4, if LTE UL transmission and NR UL transmission of the UE collide against each other as in 608 of FIG. 6 in UL subframes #3, #4, #7, and #8, that is, time intervals except an UL subframe #2 on which restrictions have been imposed so that LTE UL transmission is performed based on a reference TDD configuration or the sum of power for the LTE UL transmission and power for the NR UL transmission is greater than a maximum power value for an EN-DC operation.

According to the first scheme, the EN-DC UE performs only LTE UL transmission, but always drops NR UL transmission. Through the above scheme, LTE UL transmission playing a role as an MCG can be protected even in an UL subframe corresponding to a time interval except the UL subframe #2 on which restrictions have been imposed so that LTE UL transmission is performed based on a reference TDD configuration. Accordingly, a connection with the MCG can be maintained, and important information necessary for an RRC connection can be transmitted and received from the MCG.

According to the second scheme, the EN-DC UE maintains power for LTE UL transmission, and reduces power for NR UL, transmission so that the sum of power for. LTE UL transmission and power for NR UL transmission is equal to or smaller than a set maximum power value for an EN-DC operation. Through the above scheme, LTE UL transmission playing a role as an MCG is protected even in an UL, subframe corresponding to a time interval except the UL subframe #2 on which restrictions have been imposed so that LTE UL transmission is performed based on a reference TDD configuration. Accordingly, a connection with the MCG can be maintained, and important information necessary for an RRC connection can be transmitted to and received from the MCG. Furthermore, the transmission and reception data throughput of a UE can be improved because NR UL transmission can be performed within EN-DC maximum power.

According to the third scheme, the EN-DC UE performs only NR UL transmission and always drops LTE UL transmission. Through the above scheme, NR UL transmission playing a role as an SCG rather than LTE UL transmission playing a role as an MCG is made possible in an UL subframe corresponding to a time interval except the UL subframe #2 on which restrictions have been imposed so that LTE UL transmission is performed based on a reference TDD configuration. Accordingly, the amount of data transmission and reception using the NR can be increased, and thus UL/DL data throughput of the EN-DC UE can be increased.

As another scheme, the above three schemes may be mixed and applied to the EN-DC UE. The first scheme may be applied to a specific LTE UL, channel transmission signal or a specific LTE UL transmission signal, such as a case where LTE UL transmission is important UL transmission for an RRC connection such as physical random access channel (PRACH) transmission. If LTE UL transmission does not correspond to a specific LTE UL channel transmission signal or a specific LTE UL transmission signal, the second or third scheme may be applied. Alternatively, the third scheme may be applied to a specific NR UL channel transmission signal or a specific NR UL transmission signal, such as a case where NR UL transmission is important UL transmission such as PRACH transmission. If LTE UL transmission does not correspond to a specific NR UL channel transmission signal or a specific NR UL transmission signal, the first or second scheme may be applied.

Figure 9A:
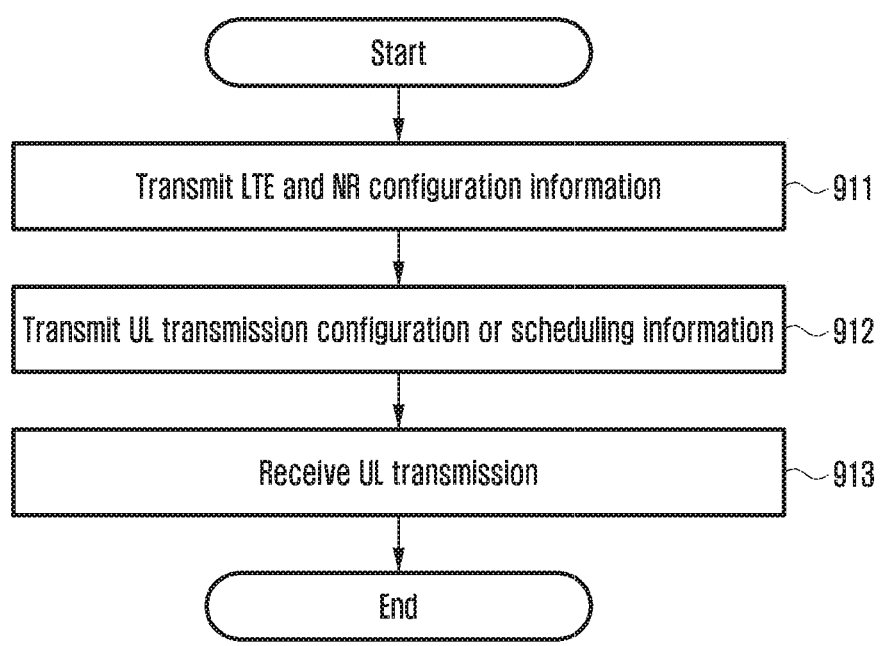
FIG. 9A is a diagram illustrating a base station (BS) operation according to an embodiment of the disclosure.

FIG. 9A is a diagram illustrating a BS operation according to an embodiment of the disclosure.

Referring to FIG. 9A, at operation 911, the BS transmits configuration information of each cell to a UE through system information or a higher signal. The configuration information may be cell-related information (e.g., at least one of TDD or FDD information, an UL/DL carrier frequency, an UL/DL frequency band, and an UL/DL subcarrier spacing) of an MCG or SCG cell, which is necessary for dual connectivity, or may be configuration information necessary for data transmission and reception in the MCG or the SCG. Alternatively, the configuration information may include at least one of pieces of configuration information related to various parameters described in the embodiments of the disclosure. The BS may be an NR BS using NR radio access, and may be an E-UTRA BS using E-UTRA radio access.

At operation 912, the BS configures UL transmission in the UE according to the embodiments proposed in the disclosure, and transmits scheduling information indicative of UL transmission. The BS may be an NR BS using NR radio access, and may be an E-UTRA BS using E-UTRA radio access. The UL transmission configuration may mean UL transmission, which is not indicated by a PDCCH like periodic channel information transmission and is configured by a higher signal configuration. UL transmission indicated by the scheduling information may mean UL transmission indicated by a PDCCH and performed by a UE, like PUSCH transmission or HARQ-ACK transmission, or may be UL transmission from a UE, such as a PRACH or an SRS.

At operation 913, the BS receives UL transmission from the UE according to the embodiments proposed in the disclosure. The BS may be an NR BS using NR radio access, and may be an E-UTRA BS using E-UTRA radio access.

Figure 9B:
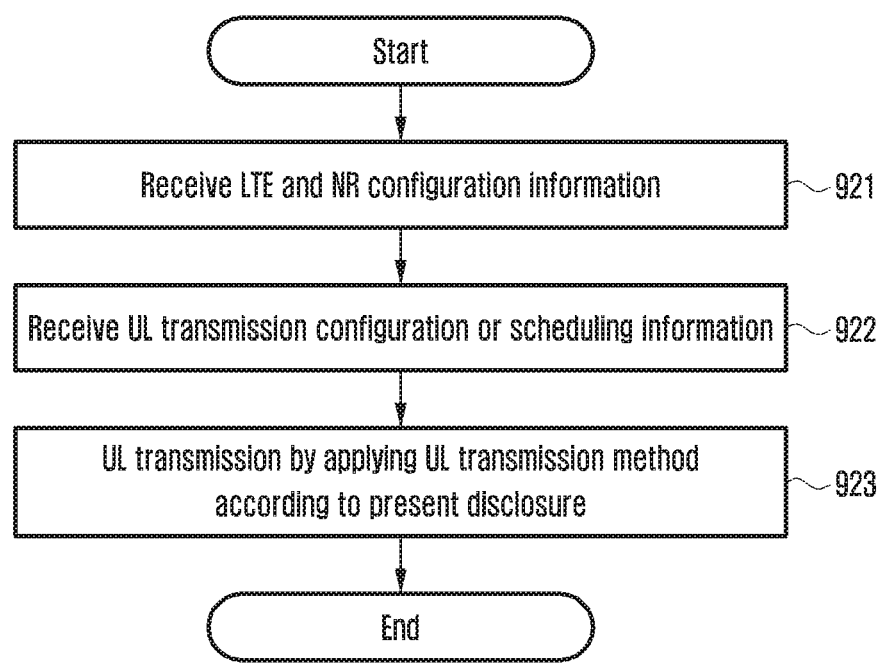
FIG. 9B is a diagram illustrating a UE operation according to an embodiment of the disclosure.

FIG. 9B is a diagram illustrating a UE operation according to an embodiment of the disclosure.

Referring to FIG. 9B, at operation 921, the UE receives configuration information of each cell from a BS through system information or a higher signal. The configuration information may be cell-related information (e.g., at least one of TDD or FDD information, an UL/DL carrier frequency, an UL/DL frequency band, and an UL/DL subcarrier spacing) of an MCG or SCG cell, which is necessary for dual connectivity, or may be configuration information necessary for data transmission and reception in the MCG or the SCG. Alternatively, the configuration information may include at least one of pieces of configuration information related to various parameters described in the embodiments of the disclosure. As described in the embodiments of the disclosure, the UE may transmit capability-related information to the BS before the UE receives the dynamic power sharing capability from the BS through a higher signal. The BS may be an NR BS using NR radio access, and may be an E-UTRA BS using E-UTRA radio access.

At operation 922, the UE receives UL transmission configuration information from the BS according to the embodiments proposed in the disclosure, and receives scheduling information indicative of UL transmission. The BS may be an NR BS using NR radio access, and may be an E-UTRA BS using E-UTRA radio access. The UL transmission configuration information may mean configuration information related to UL transmission, which is not indicated by a PDCCH like periodic channel information transmission and is configured by a higher signal configuration. The UL transmission indicated by the scheduling information may mean UL transmission indicated by a PDCCH like PUSCH transmission or HARQ-ACK transmission and transmitted by the UE, or may be UL transmission from a UE, such as a PRACH or an SRS.

At operation 923, the LTE transmits the UL transmission to the BS by controlling transmission timing and transmit power based on an UL HARQ timing relation (PDCCH-to-PUSCH transmission, PUSCH-to-PDCCH transmission, etc.) according to the embodiments proposed in the disclosure. To control the transmit power may include an operation of dropping UL transmission or reducing UL transmit power, as described in the embodiments of the disclosure. The BS may be an NR BS using NR radio access, and may be an E-UTRA BS using E-UTRA radio access.

Figure 10:
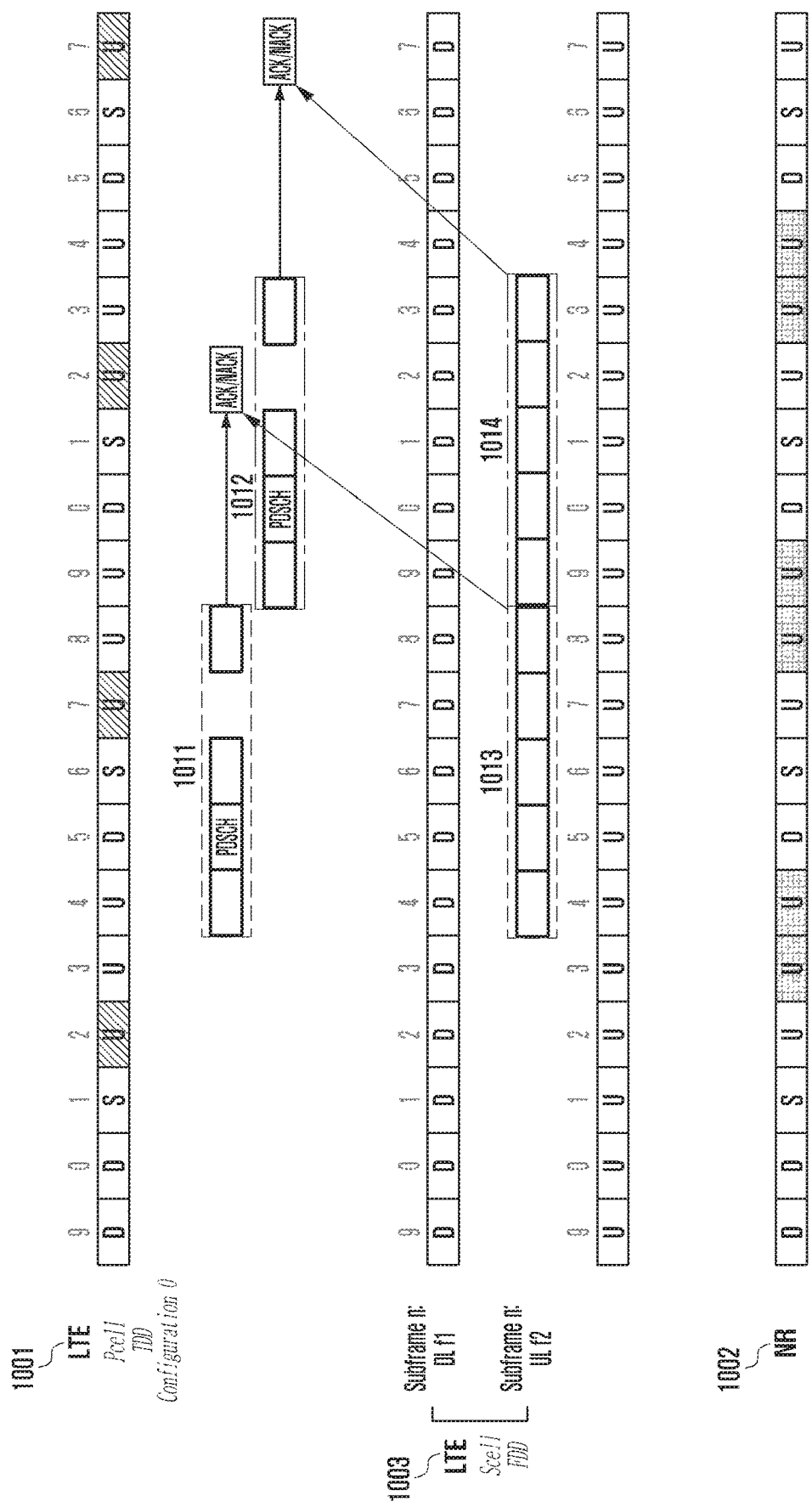
FIG. 10 is a diagram illustrating the second problem situation to be solved according to an embodiment of the disclosure.

FIG. 10 is a diagram illustrating the second problem situation to be solved according to an embodiment of the disclosure. A situation is assumed in which an EN-DC UE performs data transmission to and reception from BSs, described with reference to FIG. 5, through a cell having a configuration of FIG. 10.

Referring to FIG. 10, a situation is assumed in which LTE is an MCG and is configured in an EN-DC UE as a carrier aggregation (CA) through 2 cells, and NR is an SCG and is configured in the EN-DC UE through one cell 1002. A situation is assumed in which a primary cell (Pcell) 1001 as the first LTE cell of the MCG is a TDD cell that follows a TDD UL-DL configuration #0, and a secondary cell (Scell) 1003 as the second LTE cell of the MCG is operated as an FDD cell. Referring to FIG. 10, the Scell 1003 is an FDD cell, but may be operated as a TDD cell, in particular, as the TDD UL-DL configuration #0, such as that of the Pcell 1001. The disclosure may be applied to a case where the Scell 1003 is a TDD cell operated as another TDD UL-DL configuration. That is, the TDD configuration or FDD configuration of the Scell 1003 is not limited to the configuration illustrated in FIG. 10, and may be identically applied to other configurations.

Referring to FIG. 10, the EN-DC UE may be aware of the locations of an UL subframe, a special subframe, and a DL subframe by receiving the TDD UL-DL configuration #0 of the Pcell 1001 through system information, and may be aware of carrier information and bandwidth information of the Scell 1003 by receiving the carrier information and bandwidth information through a higher signal. The EN-DC UE may receive information on the UL or DL of the NR cell 1002 or the locations or number of flexible slots and OFDM symbols through system information, higher information, or a physical layer signal. Referring to FIG. 10, a situation in which the EN-DC UE operates to perform semi-static power sharing between LTE and NR is taken into consideration. That is, a situation is assumed in which the EN-DC UE receives a configuration for a reference TDD configuration #2 among reference TDD configurations #2, #4, and #5 capable of limiting LTE UL transmission only in a specific subframe for LTE UL transmission through a higher signal or the EN-DC UE does not indicate or report a dynamic power sharing capability to an LTE or NR BS. In this case, the EN-DC UE may be aware that it can perform LTE UL transmission only in an UL subframe #2, #7 matched with an UL subframe based on the reference TDD configuration #2, among UL subframes #2, #3, #4, #7, and #8, #9 of the TDD UL-DL configuration #0 of the LTE Pcell 1001 received through system information, and can perform NR UL transmission in a slot of the NR matched with time intervals of the remaining UL subframes #3, #4, #8, and #9. Accordingly, the EN-DC UE transmits HARQ ACK/NACK for DL data, transmitted in the LTE Pcell 1001, based on the timing relation in the UL-DL configuration #2 of Tables 3 and 4 corresponding to #2, that is, a reference TDD configuration value. That is, if DL data is received in the subframe #4, #5, #8, or #6 of the LTE Pcell 1001, the EN-DC UE transmits HARQ ACK/NACK feedback for the DL data in the subframe #2 of the LTE Pcell 1001 (1011). If DL data is received in the subframe #9, #0, #3, or #1, the EN-DC UE transmits HARQ ACK/NACK feedback for the DL data in the subframe #7 of the LTE Pcell 1001 (1012).

Since HARQ ACK/NACK for DL data reception of the LTE Scell 1003 is also transmitted in the Pcell 1001, that is, a primary cell, the HARQ-ACK/NACK may be transmitted only in a specific LTE subframe of the Pcell 1001. That is, it can be seen that LTE UL transmission can be performed only in the UL subframe #2, #7 matched with an UL subframe based on the reference TDD configuration #2 and only. NR UL transmission can be performed in a slot of the NR matched with time intervals of the remaining UL subframes #3, #4, #8, and #9.

Accordingly, the EN-DC UE transmits the HARQ ACK/NACK for the DL data transmitted by the LTE Scell 1003 based on the timing relation in the DL reference UL-DL configuration #2 of Table 8 corresponding to #2, that is, a reference TDD configuration value. That is, when receiving the DL data in the subframe #4, #5, #6, #7, #8 of the LTE Scell 1003, the EN-DC UE transmits the HAW) ACK/NACK feedback for the DL data in the subframe #2 of the Pcell 1001 (1013). When receiving the DL data in the subframe #9, #0, #1, #2, #3 of the LTE Scell 1003, the EN-DC UE transmits the HARQ ACK/NACK feedback for the DL data in the subframe #7 of the LTE Pcell 1001 (1014).

When receiving, from a BS, a. PDSCH transmitted in a subframe n-k of an FDD Scell, a UE transmits UL HAM) ACK/NACK for the PDSCH in an UL subframe n of a TDD Pcell. In this case, the k is a constituent element of a set K, and K may be defined like Table 8 similar to Table 3,

TABLE 8

| DL-reference UL/DL Config- | Subframe n | | | | | | | | | |
|---|---|---|---|---|---|---|---|---|---|---|
| uration | 0 | 1 | 2 | 3 | 4 | 5 | 6 | 7 | 8 | 9 |
| 0 | — | — | 6, 5 | 5, 4 | 4 | — | — | 6, 5 | 5, 4 | 4 |
| 1 | — | — | 7, 6 | 6, 5, 4 | — | — | — | 7, 6 | 6, 5, 4 | — |
| 2 | — | — | 8, 7, 6, 5, 4 | — | — | — | — | 8, 7, 6, 5, 4 | — | — |
| 3 | — | — | 11, 10, 9, 8, 7, 6 | 6, 5 | 5, 4 | — | — | — | — | — |
| 4 | — | — | 12, 11, 10, 9, 8, 7 | 7, 6, 5, 4 | — | — | — | — | — | — |
| 5 | — | — | 13, 12, 11, 10, 9, 8, 7, 6, 5, 4 | — | — | — | — | — | — | — |
| 6 | — | — | 8, 7 | 7, 6 | 6, 5 | — | — | 7 | 7, 6, 5 | — |

In this case, when transmitting the HARQ ACK/NACK feedback in the subframe #2 of the Pcell 1001, the EN-DC UE transmits the HARQ ACK/NACK feedback using the PUCCH format 3 or 4 or 5 defined in the LTE standard. How the HARQ ACK/NACK feedback will be transmitted using which one of the PUCCH formats may be previously configured in the EN-DC UE by the BS through a higher signal. The higher signal may include information on a PUCCH format that needs to be used when the EN-DC UE transmits the HARQ-ACK feedback and a plurality of resources for transmitting the PUCCH format.

A method of selecting, by the EN-DC LTE, one of the plurality of resources for transmitting the PUCCH format is as follows. The EN-DC UE that has received multiple PDCCH/EPDCCHs through multiple subframes of the LTE Pcell 1001 or the LTE Scell 1003 may indicate one of 4 resources using a 2-bit value of a "transmit power control (TPC) command" field of the PDCCH/EPDCCH, if a "DL assignment index (DAI)" field included in the received PDCCH/EPDCCH is greater than 1 or the "DAI" field is 1, but a PDCCH/EPDCCH in which the "DAI" field is 1 is not the first PDCCH/EPDCCH in K (Table 3 or 8). The UE indicated with one resource through the "TPC Command" field transmits the HARQ ACK/NACK feedback in a PUCCH format configured using the resource. In this case, if the "DAI" field is 1 or a PDCCH/EPDCCH in which the "DAI" field is 1 is the first PDCCH/EPDCCH in K (Table 3 or 8), a 2-bit value of the "TPC command" field of the PDCCH/EPDCCH may indicate a power control value when the configured PUCCH format is transmitted. The EN-DC UE may control and transmit power of the PUCCH format based on the "TPC Command" field.

In this case, if the EN-DC UE receives only a PDSCH through one first PDCCH/EPDCCH in the LTE Pcell 1001 or receives only one PDCCH/EPDCCH for DL SPS release (1011 or 1012) or receives only one PDSCH not having a corresponding PDCCH, or the BS has transmitted a PDCCH/EPDCCH for scheduling multiple PDSCHs in multiple subframes, but the EN-DC UE receives only a PDSCH through one first PDCCH/EPDCCH due to a reception error, there are problems in that the EN-DC UE cannot be aware of whether a "TPC command" field within the received PDCCH/EPDCCH is a field for power control when the PUCCH format is transmitted and that it has to transmit the PUCCH format using which one of the multiple configured PUCCH transmission resources. Accordingly, the disclosure provides a scheme for determining a PUCCH transmission resource of the PUCCH format 3/4/5 in the above situation.

According to the first scheme, in the above situation, the BS may separately configure a PUCCH transmission resource of the PUCCH format 3/4/5 in the EN-DC UE through a higher signal. The BS may configure an additional PUCCH resource to be used in the problem situation in addition to the plurality of resources (resources mapped to a TPC command field) for transmitting the aforementioned PUCCH format. The EN-DC UE receives the resource through a higher signal, and transmits a PUCCH format, including HARQ-ACK feedback, through the resource configured through the higher signal in the problem situation.

According to the second scheme, in the above situation, the BS may indicate a PUCCH transmission resource of the PUCCH format 3/4/5 in the EN-DC UE using a "TPC command" field within the first PDCCH/EPDCCH. Accordingly, the EN-DC UE uses the "TPC command" field for power control when transmitting the PUCCH format, and uses the "TPC command" field for in order to determine a resource for transmitting the PUCCH format. That is, the EN-DC UE transmits the PUCCH format by controlling power based on a value of the "TPC command" field in a resource indicated based on a value of the "TPC command" field within the first PDCCH/EPDCCH.

According to the third scheme, in the above situation, the EN-DC UE transmits the PUCCH format using one of the plurality of resources (resources mapped to a TPC command field) for transmitting the PUCCH format by default. That is, a resource to be used in the above problem situation, among the plurality of resources, is defined in the standard. The EN-DC UE transmits the PUCCH format, including the HARQ-ACK feedback, in the pre-defined resource.

According to the fourth scheme, in the above problem situation, the EN-DC UE transmits the PUCCH format 1a/1b, including the HARQ ACK/NACK feedback, instead of the PUCCH format 3/4/5. In this case, a transmission resource of the PUCCH format 1a/1b may be implicitly mapped to a transmission resource of the PDCCH/EPDCCH received in the problem situation. In order to prevent a PUCCH transmission resource collision against the existing LTE UE, the BS may transmit, to the EN-DC UE, an offset value to be added to a PUCCH transmission resource through a higher signal. The EN-DC UE may determine a transmission resource based on the implicitly mapped PUCCH transmission resource and the offset value. For example, the EN-DC UE that has received the offset value determines the transmission resource of the PUCCH format 1a/1b by adding the offset value to the PUCCH transmission resource implicitly mapped to the transmission resource of the received PDCCH/EPDCCH, and transmits the PUCCH format 1a/1b in the determined transmission resource.

<Scheme for Avoiding Interference Influence with LTE DL Reception or NR DL Reception Occurring Due to LTE UL or NR UL Transmission in a Situation in which LTE FDD is a Primary Cell and NR is a Secondary Cell>

Various embodiments of a scheme for avoiding interference influence with LTE DL reception or NR DL reception occurred due to LTE UL or NR UL transmission if a UE is configured with EN-DC in which LTE FDD is a primary cell and NR is a secondary cell are described with reference to the following description and FIGS. 11 and 12.

Figure 11:
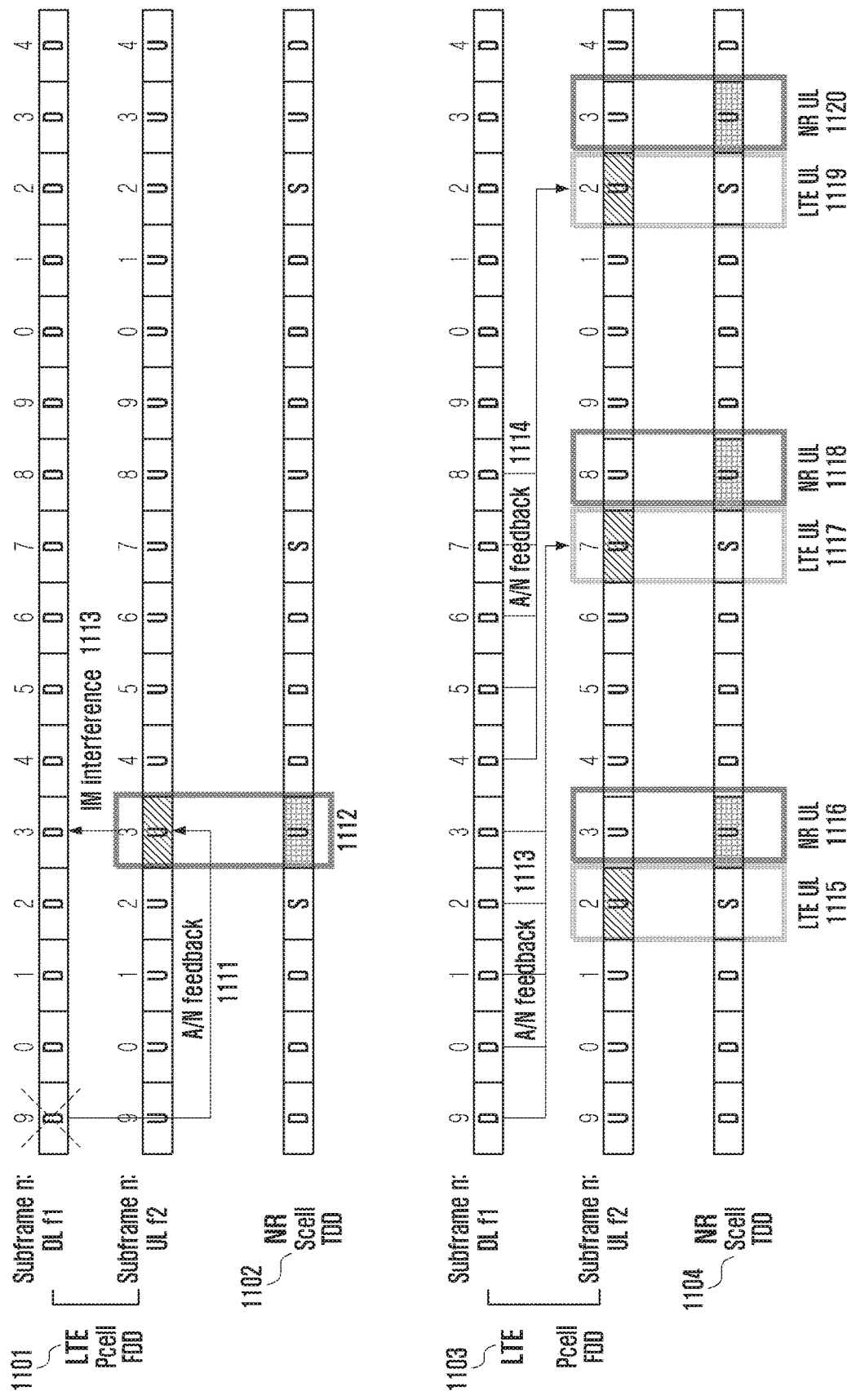
FIG. 11 is a diagram illustrating the first interference situation to be solved according to an embodiment of the disclosure.

FIG. 11 is a diagram illustrating the first interference situation to be solved according to an embodiment of the disclosure. First, to avoid influence attributable to IM interference is described with reference to FIG. 11. If simultaneous UL transmission occurs in an UL carrier of an LTE cell and an UL carrier of an NR cell in a specific band combination (e.g., an LTE band 3 and an NR band 77), an inter-modulation product from the simultaneous UL transmission may generate interference with DL reception in the DL carrier of the LTE cell. Accordingly, performance degradation for the DL reception may occur. The above interference is called IM interference. A BS (eNB or gNB) may configure the band combination in the UE through a higher signal.

Referring to FIG. 11, LTE 1101 or 1103 is an MCG and is operated as FDD, and NR 1102 or 1104 is an SCG. Accordingly, the disclosure may be applied to a case where a UE is configured with EN-DC. Referring to FIG. 11, the LTE 1101 or 1103 is an FDD cell. The EN-DC UE may be aware of DL carrier and UL carrier information of the FDD cell by receiving the DL carrier and UL carrier information from system information. The EN-DC UE may receive information on the UL or DL of the NR 1102 or 1104 or the locations or number of OFDM symbols and flexible slots from system information, higher information, or a physical layer signal.

Referring to FIG. 11, the EN-DC UE may receive DL data from a BS (eNB or gNB) in the LTE or NR cell. If the EN-DC UE has received the DL data through the LTE cell in a subframe #9, the EN-DC UE transmits feedback for the DL data in the UL carrier of the LTE cell of the subframe #3 (1112) based on PDSCH to PUCCH HARQ timing (1111) defined for LTE FDD. In this case, if the EN-DC UE receives, from a gNB, the scheduling of UL transmission in the slot #3 of the NR cell matched with the subframe #3, the EN-DC UE has the LTE DL reception influenced by IM interference due to the inter-modulation of the two UL transmissions. A possible method for avoiding the IM interference is to avoid DL scheduling that generates UL transmission based on a BS implementation. Although the gNB has scheduled NR UL transmission in the slot #3, an eNB may avoid the scheduling of DL data in the subframe #9 so that the EN-DC UE does not perform LTE UL transmission in the subframe #3. According to the above scheme, an interference influence on the LTE DL reception of the EN-DC UE can be avoided by preventing the EN-DC UE from simultaneously performing the two UL transmissions. However, the above scheme may cause DL performance degradation because it has to avoid DL scheduling.

A scheme for avoiding IM interference while preventing the above DL performance degradation is to restrict LTE UL transmission to a specific subframe in which NR UL transmission does not occur and to define PDSCH-to-PUCCH HARQ timing so that UL transmission occurs in the specific subframe. The bottom of FIG. 11 illustrates an example in which the HARQ timing in Table 8 is applied. That is, LTE UL transmission may be performed only in the subframe #2 or #7 (1115, 1117, and 1119) by allowing the EN-DC UE to use timing (or a reference TDD configuration), defined for an UL/DL configuration #2, as PDSCH-to-PUCCH HARQ timing (1113, 1114). NR UL transmission may be performed only in the remaining slots 1116, 1118, and 1120 which are not temporally matched with the subframe #2 or #7.

If a UE is configured with EN-DC, that is, the UE is configured as an MCG using E-UTRA radio access and configured as an SCG using NR radio access, the UE may receive, from an LTE BS or NR BS, a configuration for a maximum power value of the UL for LTE and a maximum power value of the UL for NR. Furthermore, the UE receives a configuration for a maximum power value for an EN-DC operation from the LTE BS or the NR BS. In this case, if the sum of the maximum power value of the UL for LTE and the maximum power value of the UL for NR is greater than the maximum power value for the EN-DC operation, the UE may apply one of semi-static power sharing and dynamic power sharing. In this case, the UE may report a capability not supporting simultaneous UL transmission to the BS through a higher signal. Alternatively, the UE may report a capability not supporting simultaneous UL transmission with respect to a specific band combination, including an LTE TDD cell or carrier and an NR cell or carrier, through a higher signal.

Semi-static power sharing between an MCG (LTE) and an SCG (NR) is described. When receiving a reference TDD configuration that limits LTE UL transmission only in a specific subframe for LTE UL transmission, if the UE does not indicate or report a dynamic power sharing capability to a BS, the UE does not expect NR UL transmission (or does not expect, from an NR BS, a configuration or scheduling indicative of NR UL transmission) in a slot of the NR matched with a time interval in which LTE is an UL subframe based on the reference TDD configuration. Through the configuration, the UE can avoid IM interference.

Dynamic power sharing between an MCG (LTE) and an SCG (NR) is described. If a UE indicates or reports a dynamic power sharing capability to a BS, the UE having a dynamic power sharing capability for UL transmission has its LTE and NR UL transmission not restricted to a specific subframe or slot, but requires a scheme for determining to which UL transmission priority will be given if LTE and NR UL transmission temporally collide against each other. If the LTE UL transmission and NR UL transmission of the UE collide against each other and the sum of power for the LTE UL transmission and power for the NR UL transmission is greater than a maximum power value for an EN-DC operation or in order to avoid influence attributable to IM interference, the UE may drop NR UL transmission. As the second scheme, the UE may reduce NR UL transmit power so that the sum of power for the LTE UL transmission and power for the NR UL transmission is smaller than the maximum power value for the EN-DC operation. Alternatively, when the NR UL transmit power is reduced, if the transmit power to be reduced is greater than X, the UE may drop NR transmission. If the transmit power to be reduced is smaller than X, the UE may perform NR UL transmission using the reduced transmit power.

FIG. 12 is a diagram illustrating the second interference situation to be solved according to an embodiment of the disclosure. First, to avoid an influence attributable to harmonic interference is described with reference to FIG. 12. If UL transmission occurs in an UL carrier of an LTE cell in a specific band combination (e.g., an LTE band 3 and an NR band 77 or an NR band 78), harmonics attributable to UL transmission may generate interference with DL reception in an NR cell. Accordingly, performance degradation for the DL reception may be caused. The above interference is called harmonic interference. A BS (eNB or gNB) may configure the band combination in the UE through a higher signal.

Referring to FIG. 12, LTE 1201 or 1203 is an MCG and operated as FDD, and NR 1202 or 1204 is an SCG, Accordingly, the disclosure may be applied to a case where a UE is configured with EN-DC. In FIG. 12, the LTE 1201 or 1203 is an FDD cell, and the EN-DC UE may be aware of DL carrier and UL carrier information of the FDD cell by receiving the DL carrier and UL carrier information from system information. The EN-DC UE may receive information on the UL or DL of the NR 1202 or 1204 or the locations or number of flexible slots and OFDM symbols from system information, higher information, or a physical layer signal.

In FIG. 12, the EN-DC UE may receive DL data from a BS (eNB or gNB) M an LTE or an NR cell. If the EN-DC UE has received DL data through the LTE cell in a subframe #0, the EN-DC LTE transmits feedback for the DL data in the UL carrier of the LTE cell of a subframe #4 based on PDSCH to PUCCH HARQ timing (1211) defined for LTE FDD. In this case, if the EN-DC UE has received the DL data from a gNB in a slot #4 of the NR cell temporally matched with the subframe #4, the EN-DC UE has its NR DL reception influenced by interference due to harmonics attributable to UL transmission (1212). A possible method for avoiding the harmonic interference is to avoid DL scheduling that generates the UL transmission based on a BS implementation. Although a gNB has transmitted NR DL data in the slot #4, an eNB may avoid the scheduling of the DL data in the subframe #0 so that the EN-DC LTE does not perform LTE UL transmission in the subframe #4. Through the above scheme, an interference influence on the NR DL reception of the EN-DC UE can be avoided by preventing the EN-DC UE from performing LTE UL transmission in a slot in which NR DL data is received. However, the above scheme may cause DL performance degradation because LTE DL scheduling must be avoided.

A scheme for avoiding harmonic interference while preventing the above DL performance degradation is to restrict LTE UL transmission to a specific subframe in which NR UL transmission occurs and to define PDSCH-to-PUCCH HARQ timing so that UL transmission occurs in the specific subframe. The bottom of FIG. 12 illustrates an example in which the HARQ timing in Table 8 is applied, That is, LTE UL transmission may be performed only in a subframe #2 or #7 in which UL slots including NR UL transmission occur (1215, 1216, 1217) by allowing the EN-DC UE to use timing (or a reference TDD configuration), defined for an UL/DL configuration #2, as PDSCH-to-PUCCH HARQ timing (1213, 1214). Accordingly, harmonic interference with NR DL reception can be avoided. NR UL transmission may be performed even in the remaining slots in addition to the UL slots #2 and #7.

If a UE is configured with EN-DC, that is, the UE is configured as an MCG using E-UTRA radio access and configured as an SCG using NR radio access, the UE may receive, from an LTE BS or NR BS, a configuration for a maximum power value of UL for LTE and a maximum power value of UL for NR. Furthermore, the UE receives a configuration for a maximum power value for an EN-DC operation from the LTE BS or the NR BS. In this case, if the sum of the maximum power value of the UL for LTE and the maximum power value of the UL for NR is greater than the maximum power value for the EN-DC operation, the UE may apply one of semi-static power sharing and dynamic power sharing. In this case, the UE may report a capability not supporting simultaneous transmission to the BS through a higher signal. Alternatively, the UE may report a capability not supporting simultaneous UL transmission through a higher signal with respect to a specific band combination including an LTE TDD cell or carrier and an NR cell or carrier.

Semi-static power sharing between an MCG (LTE) and an SCG (NR) is described. If a UE receives a reference IDD configuration that restricts LTE UL transmission only in a specific subframe for LTE UL transmission, when the UE does not indicate or report a dynamic power sharing capability to a BS, the UE expects LTE UL transmission only in an LTE UL subframe configured to perform LTE UL transmission based on the reference TDD configuration (or does not expect, from the LTE BS, a configuration or scheduling indicative of LTE UL transmission in an UL subframe except the UL subframe). Through the configuration, the UE can avoid harmonic interference.

Dynamic power sharing between an MCG (LTE) and an SCG (NR) is described. If a UE indicates or reports the dynamic power sharing capability to a BS, the UE having the dynamic power sharing capability for UL transmission has its LTE and NR UL transmission not restricted to a specific subframe or slot. In contrast, if NR slots other than an NR slot matched with an LTE UL subframe configured to perform LTE UL transmission based on a reference IDD configuration are indicated as UL slots, NR UL transmission is scheduled, LTE UL transmission is scheduled outside an LTE UL subframe, and LTE UL transmission and NR DL reception temporally collide against each other, there is a need for a scheme for determining, by the UE, to which operation priority will be given. If the LTE UL transmission and NR UL transmission of the UE collide against each other and the sum of power for the LTE UL transmission and power for the NR UL transmission is greater than a maximum power value for an EN-DC operation or in order to avoid an influence attributable to harmonic interference (if an NR slot is a DL slot), the UE may always drop LTE UL transmission. As the second scheme, the UE may reduce NR UL transmit power so that the sum of power for the LTE UL transmission and power for the NR UL transmission is smaller than the maximum power value for the EN-DC operation. Alternatively, when the NR UL transmit power is reduced, if the transmit power to be reduced is greater than X, the UE may drop NR transmission. If the transmit power to be reduced is smaller than X, the UE may perform NR UL transmission using the reduced transmit power. In the second scheme, the UE may perform LTE UL transmission using the configured LTE UL transmit power, and may attempt NR DL reception despite the influence of harmonic interference if an NR slot is a DL slot.

If an EN-DC UE is influenced by interference with its LTE or NR DL reception due to the aforementioned IM interference and harmonic interference with respect to a specific band combination, a scheme for an operation of the EN-DC UE is described.

If UL transmission occurs in an UL carrier of an LTE cell in a specific band combination (e.g., an LTE band 3 and an NR band 77), harmonics attributable to the UL transmission may generate harmonic interference with DL reception in an NR cell. Accordingly, performance degradation for the DL reception may be caused. Furthermore, if simultaneous UL transmission occurs in an UL carrier of an LTE cell and an UL carrier of an NR cell in the band combination, an inter-modulation product from the simultaneous UL transmission may generate interference with DL reception in a DL carrier of the LTE cell. Accordingly, performance degradation for the DL reception may be caused in this case, in order to solve the above interference problem, the EN-DC UE may perform the following operation.

As the first scheme, if a UE does not indicate a capability not supporting simultaneous UL transmission through a higher signal (i.e., does not indicate a singleUL-Transmission capability or indicate a capability supporting simultaneous UL transmission), the UE takes into consideration a situation in which an UL subframe of an LTE cell and an UL slot of an NR cell are temporally matched as in 1215, 1216, and 1217 of FIG. 12. Alternatively, the LTE takes into consideration a situation in which an subframe of an LTE cell and an UL slot of an NR cell are temporally matched and simultaneous UL transmission in the LTE cell and the NR cell is indicated or configured by a BS. Under the condition and situation, the UE performs only LTE UL transmission only in an LTE subframe #2 or an LTE subframe #7, and does not expect NR UL transmission or NR DL reception in an NR slot #2 or an NR slot #7. Alternatively, if NR UL transmission is configured or indicated in NR slots, the UE drops the NR UL transmission. Alternatively, if NR DL reception is configured or indicated in NR slots, the UE does not decode the NR DL reception or may attempt to decode NR DL reception by considering harmonic interference. The NR UL transmission or the NR DL reception may be configured or indicated in an NR slot except 1215, 1216, and 1217.

As the second scheme, if a UE indicates a capability not supporting simultaneous UL transmission through a higher signal, the UE takes into consideration a situation in which an UL subframe of an LTE cell and an UL slot of an NR cell are temporally matched as in 1215, 1216, and 1217 of FIG. 12. Alternatively, the LTE takes into consideration a situation in which an UL subframe of an LTE cell and an UL slot of an NR cell are temporally matched and simultaneous UL transmission in the LTE cell and the NR cell is indicated or configured by a BS. Under the condition and situation, the UE does not expect LTE DL reception in the LTE subframe #2 or the LTE subframe #7 or does not decode the LTE DL reception.

As the third scheme, regardless of which capability a UE indicates, the UE takes into consideration a situation in which an UL subframe of an LTE cell and an UL slot of an NR cell are temporally matched as in 1215, 1216, and 1217 of FIG. 12. Alternatively, the UE takes into consideration a situation in which an UL subframe of an LTE cell and an UL slot of an NR cell are temporally matched and simultaneous UL transmission in the LTE cell and the NR cell is indicated or configured by a BS. Under the condition and situation, the UE does not expect LTE DL reception in the LTE subframe #2 or the LTE subframe #7 or does not decode the LTE DL reception.

As the fourth scheme, a UE transmits, to a BS (eNB or gNB), information on whether the UE prefers single UL transmission (or prefers to avoid IM interference) or simultaneous UL transmission (or prefers to avoid harmonic interference) with respect to the specific band combination. The BS configures a reference TDD configuration in the UE. Accordingly, the UE may be scheduled to perform preferred UL transmission. If the UE indicates that it prefers single UL transmission with respect to the BS through a higher signal, the UE may transmit HARQ-ACK for a PDSCH, transmitted in multiple LTE subframes, through a specific LTE UL subframe as in the embodiment of FIG. 11 based on a reference TDD configuration. If the UE indicates that it prefers simultaneous UL transmission with respect to the BS through a higher signal, in a conventional technology, the UE transmits HARQ-ACK for DL data, transmitted in one LTE subframe, in an LTE UL subframe by applying n+4 HARQ timing of an LTE FDD cell. In contrast, in the disclosure, the UE may transmit HARQ-ACK for a PDSCH, transmitted in multiple LTE subframes, through a specific LTE UL subframe as in the embodiment of FIG. 12 based on a reference TDD configuration.

A method of transmitting, by the UE, information whether the UE prefers single UL transmission (or prefers to avoid IM interference) to the BS through a higher signal (capability signaling) is specifically described. The UE may report a singleUL-Transmission capability (or does not report a capability supporting simultaneous UL transmission), and may report a tdm-pattern capability. In a conventional technology, a UE is fundamentally incapable of simultaneous UL transmission. If the UE reports the singleUL-Transmission capability to a BS, the UE may report that it can support a tdm-pattern configuration (or reference TDD setting or a reference TDD configuration) for single UL transmission by additionally reporting a tdm-pattern capability. In the disclosure, a UE is capable of simultaneous UL transmission, and thus may report the singleUL-Transmission capability and the tdm-pattern capability in order to avoid IM interference although it is not necessary to report the singleUL-Transmission capability. The aforementioned singleUL-Transmission capability and tdm-pattern capability are terms for a description, do not limit the disclosure, and may be understood as given terms for performing a function similar to the example described in the disclosure.

A method of reporting, by the UE, information on whether it prefers simultaneous UL transmission (or prefers to avoid harmonic interference) to a BS through a higher signal (capability signaling) is specifically described. The UE does not report a singleUL-Transmission capability (or reports a capability supporting simultaneous UL transmission), and may report only a tdm-pattern capability. In a conventional technology, the UE can report that it can support the tdm-pattern configuration (or reference TDD setting or a reference TDD configuration) for single UL transmission by additionally reporting the tdm-pattern capability only if the UE reports the singleUL-Transmission capability to the BS. In the disclosure, however, a UE is capable of simultaneous UL transmission, and thus may report only the tdm-pattern capability without reporting the singleUL-Transmission capability in order to avoid harmonic interference although the UE is a UE that does not need to report the singleUL-Transmission capability. As the fifth scheme, in a situation in which an UL subframe of an LTE cell and an UL slot of an NR cell are temporally matched and simultaneous UL transmission in an LTE cell and an NR cell is indicated or configured by a BS, the UE does not expect LTE DL reception in the LTE subframe #2 or the LTE subframe #7 or does not decode LTE DL reception. If simultaneous UL transmission in the LTE cell and the NR cell is not indicated or configured by the BS, that is, an UL transmission only in one of the two cells is indicated or configured by the BS, the UE decodes LTE DL reception in the LTE subframe 42 or the LTE subframe #7.

Figure 13A:
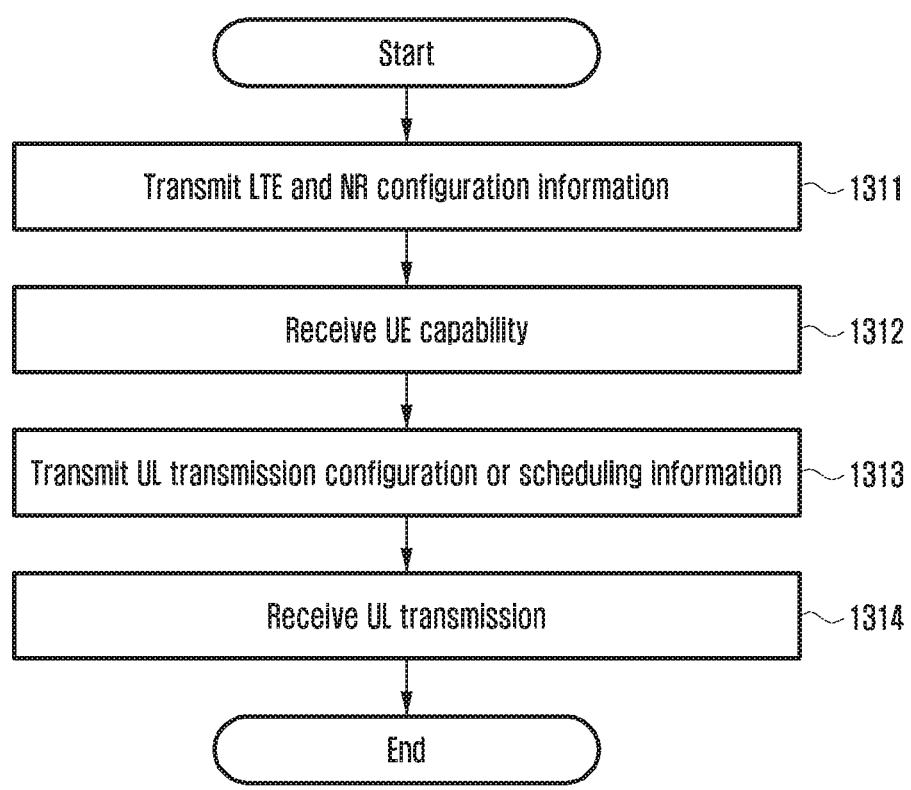
FIG. 13A is a diagram illustrating a BS procedure according to embodiments proposed according to an embodiment of the disclosure.

FIG. 13A is a diagram illustrating a BS procedure according to an embodiment of the disclosure.

Referring to FIG. 13A, at operation 1311, the BS transmits configuration information of each cell to a UE through system information or a higher signal, as described with reference to FIGS. 11 and 12 and subsequent proposals of the disclosure. The configuration information may be cell-related information (e.g., at least one of TDD or FDD information, an UL/DL carrier frequency, an UL/DL frequency band, and an UL/DL subcarrier spacing) of an MCG or SCG cell, which is necessary for dual connectivity, or may be configuration information necessary for data transmission and reception in the MCG or the SCG. Alternatively, the configuration information may include at least one of pieces of configuration information related to various parameters (reference configuration information, an HARQ an offset, etc.) described in the embodiments of the disclosure. The BS may be an NR BS using NR radio access, and may be an E-UTRA BS using E-UTRA radio access.

At operation 1312, the BS receives the capability of the UE from the UE, as described with reference to FIGS. 11 and 12 and subsequent proposals of the disclosure.

At operation 1313, the BS configures UL transmission in the UE, based on the proposal of FIGS. 11 and 12 and subsequent proposals of the disclosure, and transmits scheduling information indicative of the UL transmission. The BS may be an NR BS using NR radio access, and may be an E-UTRA BS using E-UTRA radio access. The UL transmission configuration may mean UL transmission, which is not indicated by a PDCCH like periodic channel information transmission and is configured by a higher signal. The UL transmission indicated by the scheduling information may mean UL transmission, which is indicated by a PDCCH like PUSCH transmission or HARQ-ACK transmission and transmitted by the UE, or may be UL transmission from the UE, such as a PRACH or an SRS.

At operation 1314, the BS receives UL transmission from the UE based on the proposal of FIGS. 11 and 12 and subsequent proposals of the disclosure. The BS may be an NR BS using NR radio access, and may be an E-UTRA BS using E-UTRA radio access.

Figure 13B:
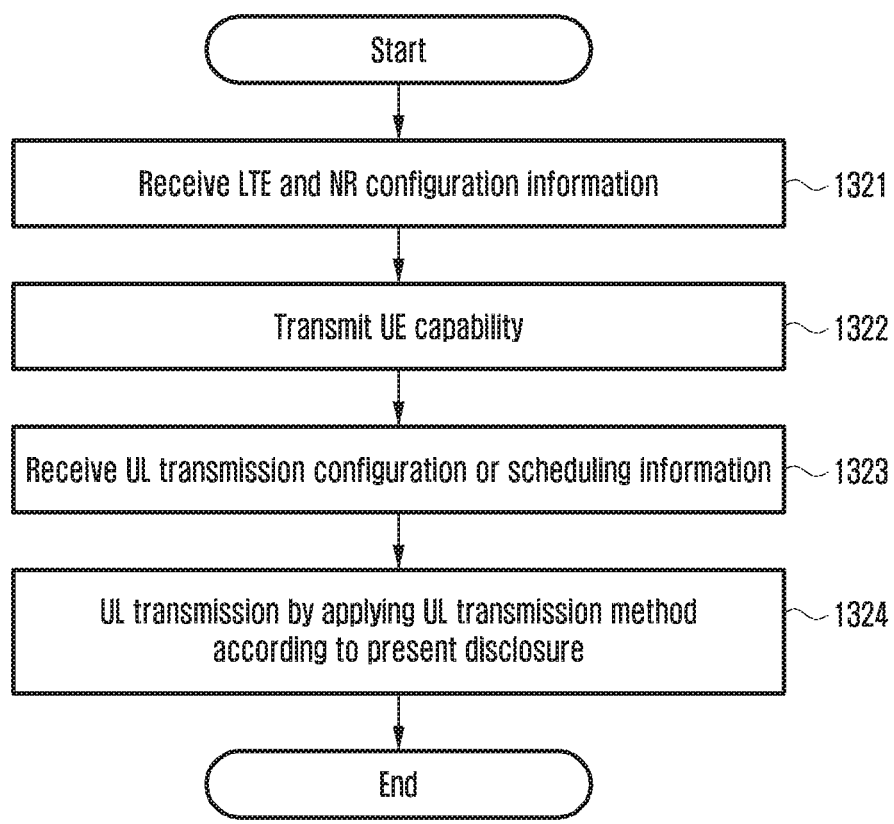
FIG. 13B is a diagram illustrating a UE procedure according to embodiments proposed according to an embodiment of the disclosure.

FIG. 13B is a diagram illustrating a UE procedure according to an embodiment of the disclosure.

Referring to FIG. 13B, at operation 1321, the UE receives configuration information of each cell from a BS through system information or a higher signal, as described with reference to FIGS. 11 and 12 and in subsequent proposals of the disclosure. The configuration information may be cell-related information (e.g., at least one of TDD or FDD information, an UL/DL carrier frequency, an UL/DL frequency band, and an UL/DL subcarrier spacing) of an MCG or SCG cell, which is necessary for dual connectivity, or may be configuration information necessary for data transmission and reception in the MCG or the SCG. Alternatively, the configuration information may include at least one of pieces of configuration information related to various parameters (reference configuration information, an HARQ an offset, etc.) described in the embodiments of the disclosure. As described in the embodiments of the disclosure, before receiving a dynamic power sharing capability from the BS through a higher signal, the UE may transmit capability-related information to the BS. The BS may be an NR BS using NR radio access, and may be an E-UTRA BS using E-UTRA radio access.

At operation 1322, the UE transmits the capability of the UE to the BS, as described with reference to FIGS. 11 and 12 and in subsequent proposals of the disclosure.

At operation 1323, the UE receives UL transmission configuration information from the BS, based on the proposal of FIGS. 11 and 12 and subsequent proposals of the disclosure, and receives scheduling information indicative of the UL transmission. The BS may be an NR BS using NR radio access, and may be an E-UTRA. BS using E-UTRA radio access. The UL transmission configuration information may mean configuration information related to UL transmission, which is not indicated by a PDCCH like periodic channel information transmission and whose transmission is configured by a higher signal configuration. The UL transmission indicated by the scheduling information may mean UL transmission, which is indicated by a PDCCH like PUSCH transmission or HARQ-ACK transmission and is transmitted by the LTE, or may be UL transmission from a UE, such as a PRACH or an SRS.

At operation 1324, the UE performs UL transmission to the BS by controlling transmission timing and transmit power using an HARQ timing relation (PDSCH-to-PDCCH transmission, PDCCH-to-PUSCH transmission, PUSCH-to-PDCCH transmission, etc.), based on the proposal of FIGS. 11 and 12 and subsequent proposals of the disclosure. To control the transmit power may include an operation of dropping UL transmission or reducing UL transmit power, as described in the embodiments of the disclosure. The BS may be an NR BS using NR radio access, and may be an E-UTRA BS using E-UTRA radio access.

Figure 14:
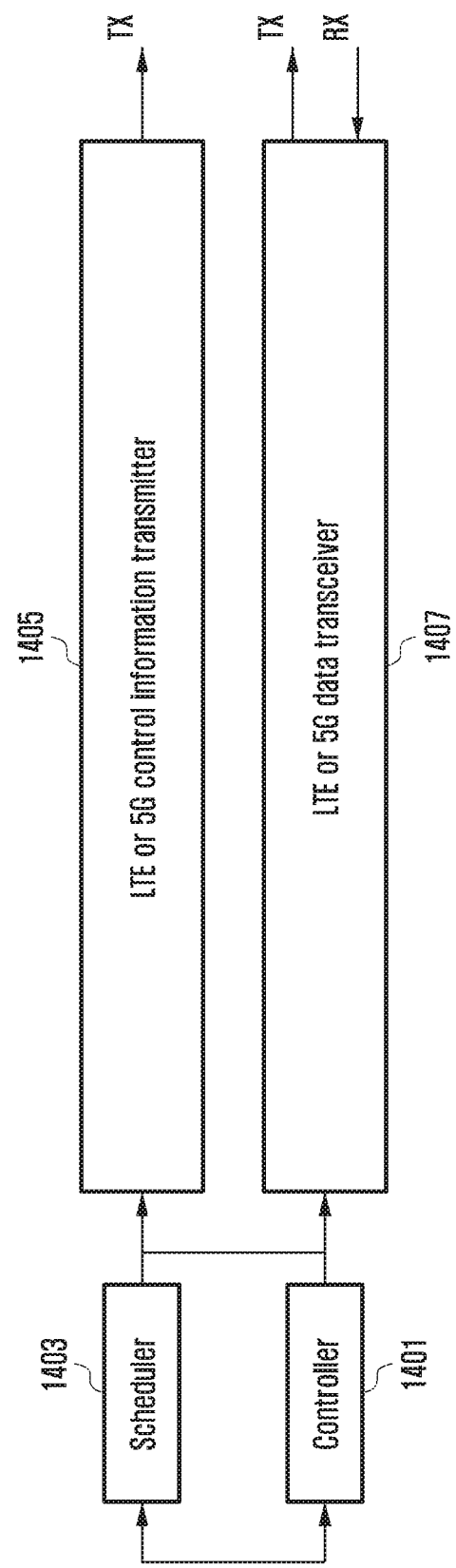
FIG. 14 is a diagram illustrating a configuration of a BS according to embodiments proposed according to an embodiment of the disclosure.

FIG. 14 is a diagram illustrating a configuration of a BS according to an embodiment of the disclosure.

A controller 1401 may configure required information according to a BS procedure of the disclosure and various embodiments of the disclosure, and may control UL transmission timing and UL transmission reception from a UE according to various embodiments of the disclosure. The controller 1401 may control an LTE or 5G control information transmitter 1405 to transmit control information, and may transmit data to a UE or receive data from the UE through an LTE or 5G data transceiver 1407. Furthermore, the controller 1401 may control the LTE or 5G data transceiver 1407 to transmit or receive LTE or 5G data to or from the UE by scheduling the LTE or 5G data through a scheduler 1403.

The BS apparatus has been configured with the controller 1401, the scheduler 1403, the control information transmitter 1405, and the data transceiver 1407, but the BS apparatus may be configured with a transceiver and a controller. The controller may control an operation of the BS according to various embodiments of the disclosure. In this BS apparatus, LTE and 5G have been described together for convenience sake, but the BS apparatus may be an NR BS using NR radio access, and may be an E-UTRA BS using E-UTRA radio access.

Figure 15:
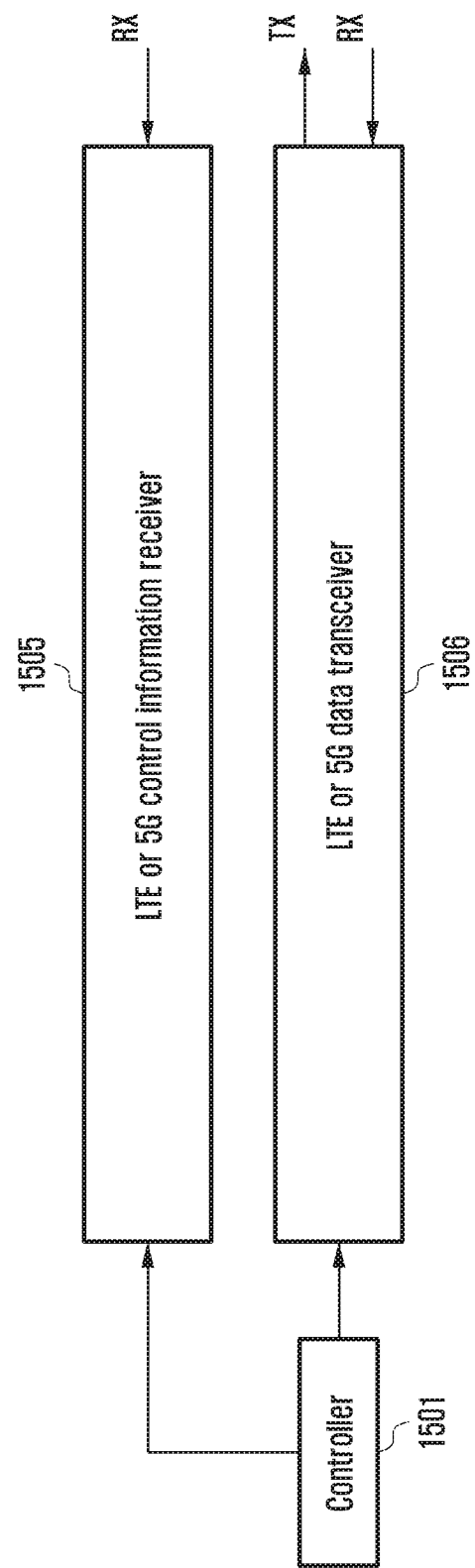
FIG. 15 is a diagram illustrating a configuration of a UE according to embodiments proposed according to an embodiment of the disclosure.

Referring to FIG. 15 is a diagram illustrating a configuration of a UE according to embodiments proposed in the disclosure.

A controller 1501 may receive required configuration information and scheduling from a BS according to a UE procedure of the disclosure and various embodiments of the disclosure, and may control to perform UL transmission configured by a BS or indicated by scheduling by controlling UL transmission timing and UL transmit power according to the disclosure. The UE may receive an UL data channel transmission resource location from a BS or may multiplex UL control information with an UL data channel and transmit the UL data channel through an LTE or 5G control information receiver 1505 and an LTE or 5G data transceiver 1506. The controller 1501 may control the LTE or 5G data transceiver 1506 to transmit or receive LTE or 5G data, scheduled at a received resource location, to or from an LTE or 5G BS. The UE apparatus has been configured with the controller 1501, the control information transmitter 1505, and the data transceiver 1506, but the UE apparatus may be configured with a transceiver and a controller. The controller may control an operation of the UE according to various embodiments of the disclosure in this drawing, the LTE and 5G apparatuses have been described as if they are together for convenience sake, but apparatuses for LTE or 5G may be separately configured. A BS for transmitting or receiving control information and data may be an NR BS using NR radio access, and may be an E-UTRA BS using E-UTRA radio access.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method performed by a terminal in a communication system, the method comprising:
   receiving, from a base station, information associated with uplink (UL)/downlink (DL) reference configuration for a dual UL transmission in evolved universal terrestrial radio access (E-UTRA) new radio (NR) dual connectivity (EN-DC), the UL/DL reference configuration indicating a time during which the terminal configured with the EN-DC is allowed to transmit;
   transmitting capability information of the terminal to the base station; and
   transmitting, to the base station, an uplink transmission for a master cell group (MCG) without transmitting an uplink transmission for a secondary cell group (SCG), in case that the uplink transmission for the SCG overlaps with the uplink transmission for the MCG on a subframe on the MCG,
   wherein the capability information indicates a capability to support for dynamic power sharing between the E-UTRA and the NR for the EN-DC, and the capability information does not indicate a capability to support the information for the dual UL transmission in the EN-DC.

2. The method of claim 1, wherein a primary cell associated with the MCG corresponds to a frequency division duplex (FDD) cell.

3. The method of claim 1, wherein a sum of power for the uplink transmission for the MCG and power for the uplink transmission for the SCG is greater than a configured maximum power.

4. The method of claim 1,
   wherein the MCG is associated with a long-term evolution (LTE) radio access technology (RAT), and
   wherein the SCG is associated with an NR RAT.

5. A terminal in a communication system, the terminal comprising:
   a transceiver; and
   at least one processor configured to:
      control the transceiver to receive, from a base station, information associated with uplink (UL)/downlink (DL) reference configuration for a dual UL transmission in evolved universal terrestrial radio access (E-UTRA) new radio (NR) dual connectivity (EN-DC), the UL/DL reference configuration indicating a time during which the terminal configured with the EN-DC is allowed to transmit,
      control the transceiver to transmit capability information of the terminal to the base station, and
      control the transceiver to transmit, to the base station, an uplink transmission for a master cell group (MCG) without transmitting an uplink transmission for a secondary cell group (SCG), in case that the uplink transmission for the SCG overlaps with the uplink transmission for the MCG on a subframe on the MCG,
   wherein the capability information indicates a capability to support for dynamic power sharing between the E-UTRA and the NR for the EN-DC, and the capability information does not indicate a capability to support the information for the dual UL transmission in the EN-DC.

6. The terminal of claim 5, wherein a primary cell associated with the MCG corresponds to a frequency division duplex (FDD) cell.

7. The terminal of claim 5, wherein a sum of power for the uplink transmission for the MCG and power for the uplink transmission for the SCG is greater than a configured maximum power.

8. The terminal of claim 5, wherein the MCG is associated with a long-term evolution (LTE) radio access technology (RAT) and the SCG is associated with an NR RAT.

* * * * *